(12) United States Patent
Dana et al.

(10) Patent No.: US 7,263,791 B2
(45) Date of Patent: Sep. 4, 2007

(54) DISPLAY DEVICE

(75) Inventors: Yossi Shimon Dana, Jerusalem (IL); Avner Madar, Rosh Tzurim (IL)

(73) Assignee: R.E.D. Revital Entrepreneurship & Development Ltd., Tel-Aviv (IL)

( * ) Notice: Subject to any disclaimer, the term of this patent is extended or adjusted under 35 U.S.C. 154(b) by 325 days.

(21) Appl. No.: 10/333,823

(22) PCT Filed: Jul. 26, 2001

(86) PCT No.: PCT/IL01/00695

§ 371 (c)(1),
(2), (4) Date: Jan. 23, 2003

(87) PCT Pub. No.: WO02/09071

PCT Pub. Date: Jan. 31, 2002

(65) Prior Publication Data

US 2004/0020088 A1    Feb. 5, 2004

(30) Foreign Application Priority Data

Jul. 26, 2000    (IL)    ..... 137527

(51) Int. Cl.
*G03B 25/02*    (2006.01)
(52) U.S. Cl. ............. 40/454; 40/466; 40/470
(58) Field of Classification Search ........ 40/453, 40/454, 466, 470, 508, 509, 543
See application file for complete search history.

(56) References Cited

U.S. PATENT DOCUMENTS

| | | |
|---|---|---|
| 1,475,430 A | 11/1923 | Curwen |
| 1,989,553 A | 1/1935 | Kanolt |
| 3,119,195 A | 1/1964 | Braunhut |
| 3,314,179 A * | 4/1967 | Leach ............ 40/437 |
| 3,562,941 A | 2/1971 | Boden |
| 3,613,277 A | 10/1971 | Rose et al. |
| 3,660,919 A | 5/1972 | Nagel |
| 3,686,781 A | 8/1972 | Calhoun, Jr. |
| 4,118,879 A | 10/1978 | Simon |
| 5,007,190 A | 4/1991 | Shyu |
| 5,100,330 A | 3/1992 | Sekiguchi |
| 5,146,703 A * | 9/1992 | Boden .............. 40/454 |
| 5,270,636 A | 12/1993 | Lafferty |
| 5,276,987 A | 1/1994 | Honse |
| 5,344,250 A | 9/1994 | Kringel et al. |
| 5,416,997 A | 5/1995 | Dyment et al. |
| 5,440,214 A * | 8/1995 | Peeters .............. 318/685 |
| 5,488,451 A | 1/1996 | Goggins |

(Continued)

FOREIGN PATENT DOCUMENTS

EP    0 619 513    10/1994

(Continued)

OTHER PUBLICATIONS

Kumagai, T.; JP 02-211437; Aug. 22, 1990 & Patent Abstracts of Japan; Nov. 7, 1990; vol. 014; No. 508 (P-1128).

(Continued)

*Primary Examiner*—Gary C. Hoge

(57) ABSTRACT

A multi-image display device. Some embodiments include an alignment mechanism for correcting misalignments of an indicia, an image selector and a motion train, which form parts of the display device.

69 Claims, 13 Drawing Sheets

U.S. PATENT DOCUMENTS

| | | | |
|---|---|---|---|
| 5,494,445 | A | 2/1996 | Sekiguchi et al. |
| 5,513,458 | A | 5/1996 | Dehli |
| 5,586,089 | A | 12/1996 | McGarvey |
| 5,612,741 | A * | 3/1997 | Loban et al. ............... 348/383 |
| 5,647,151 | A * | 7/1997 | Fantone et al. ............... 40/454 |
| 5,724,758 | A | 3/1998 | Gulick, Jr. |
| 5,757,545 | A * | 5/1998 | Wu et al. .................... 359/463 |
| 5,760,572 | A | 6/1998 | Takeda et al. |
| 5,767,650 | A | 6/1998 | Dehli et al. |
| 6,055,753 | A * | 5/2000 | Sondericker, III ............ 40/471 |
| 6,055,754 | A * | 5/2000 | Melhuus ...................... 40/601 |
| 6,078,424 | A | 6/2000 | Morton |
| 6,226,906 | B1 * | 5/2001 | Bar-Yona ...................... 40/454 |
| 6,553,699 | B2 * | 4/2003 | Edmunds et al. ............. 40/624 |
| 2001/0018808 | A1 * | 9/2001 | Bar-Yona ...................... 40/454 |

FOREIGN PATENT DOCUMENTS

| | | |
|---|---|---|
| EP | 0685924 | 12/1995 |
| EP | 0 713 120 | 5/1996 |
| EP | 0 570 807 | 7/1999 |
| EP | 1 001 401 | 5/2000 |
| EP | 1 347 431 | 9/2003 |
| GB | 429042 | 5/1935 |
| JP | 4626659 | 4/1971 |
| JP | 5114019 | 5/1976 |
| JP | 2240644 | 9/1990 |
| JP | 5-17537 | 3/1993 |
| JP | 7-334259 | 12/1995 |
| JP | 7334259 | 12/1995 |
| WO | WO 97/30436 | 8/1997 |
| WO | WO 02/23510 | 3/2002 |
| WO | WO 02/086849 | 10/2002 |
| WO | WO 03/009264 | 1/2003 |
| WO | WO 03/077228 | 9/2003 |

OTHER PUBLICATIONS

Lenticular Printing Software; Updated Jan. 21, 2004; Lenticular Holograms 3D Printing Software; http://www.3dz.co.uk.

3DZ, v3.00 Software for PC; Updated Jan. 21, 2004; Lenticular Lenses—Plastic lens sheet; http://www.3dz.co.uk/products.html.

* cited by examiner

DISPLAY DEVICE

RELATED APPLICATIONS

The present application is a U.S. national application of PCT Application No. PCT/IL01/00695, filed on Jul. 26, 2001.

FIELD OF THE INVENTION

The present invention relates to display devices and the calibration thereof.

BACKGROUND OF THE INVENTION

Display devices with changing images have been used for many years, some on small, handheld devices, others on desktop-sized displays, for example as toys and educational displays. Medium size varying image displays are used as indoor advertisements, and large displays are used for outdoor street signs. An exemplary type of changing image outdoor display is constructed of triangular prisms. The triangular prisms are arranged so that all the prisms simultaneously present a set of facets to the view of the public. After a predetermined display period, all the prisms turn simultaneously to display the next set of facets. Since triangular prisms have three facets, such displays have three pictures, which are displayed in sequence. Each of the pictures to be displayed is divided into a plurality of linear segments, and each segment is pasted on a single facet. Typically, a plurality of segments are printed on one sheet which is pasted on a plurality of adjacent prisms, with a cut between the prisms being made after the pasting step.

Another type of multi-picture display, which is not limited to three different pictures, is based on a different principle. All the segments of all the pictures are arranged on a single indicia in a special spatial configuration. To display the images of a series of N pictures, each of the N pictures are segmented into M strips. The strips are deposited or otherwise created on a "indicia carrier". The composite of all the strips is the indicia. In the indicia all the strips are parallel to one another. The indicia carrier may be made of any appropriate material which is of stable dimensions.

The indicia is viewed through an array of parallel cylindrical lenses. The cylindrical lens array is so designed that the distance between the focal points (lines) of the component lenses is equal to the width of the lenses and each lens views one strip. The indicia is oriented so that the strip centers are parallel to the focal lines of the cylindrical lenses of the array.

A property of this configuration is that the segments have an equal width and the centers of the segments of one picture are offset by a fixed linear amount from centers of the segments of a second picture.

The image displayed is of that picture whose linear segments (strips) are centered along the focal lines of the cylindrical lenses. By shifting the lens array (or indicia), in a direction perpendicular to the segments, by the fixed linear amount, a different picture is selectively displayed. This technique is described, for example, in U.S. Pat. No. 1,475,430, issued Nov. 27, 1923, and more recently in Japanese Patent HEI 2-211437 published Aug. 22, 1990. A recent method for the manufacture of an indicia has been described in U.S. Pat. No. 5,100,330 issued Mar. 31, 1992. All of the above patent publications are incorporated herein by reference.

The practical application of the lens array type of display has apparently been limited to small displays, such as toys, educational displays, indoor displays and the like, with measurements generally under 0.5 square meter.

The presentation using indicia carriers typically demands accuracy, particularly in the dimensional relationship of indicia parameters and the pitch of the array of lenses. While such accuracy is definitely achievable with small display units, the difficulty in achieving such accuracy may be the reason for lack of practical large lens displays.

SUMMARY OF THE INVENTION

An aspect of some embodiments of the present invention relates to providing large lens array displays, for example having a display area of over 1, 2, 4, 6 or even 8 square meters. Such large displays are useful for street and highway information presentation. In some embodiments, the displays are made the same size as standard type street signs, for example to allow sharing of printing, deployment and/or sign hardware infrastructure. However, some embodiments of the invention are usefully applied to small and/or indoor displays.

An aspect of some embodiments of the invention relates to providing a lens array display in which replacement of an indicia carrier is made simpler and/or faster.

An aspect of some embodiments of the invention relates to detection of misalignment and/or adjustment of the alignment between an indicia or a printed image and a lens array of a lens array display. Not all types of misalignment are addressed in every embodiment of the invention. Exemplary types of misalignment, include, relative parallelism and/or rotation of the lens, the indicia and/or the indicia path. The alignments may be zero order (offset), first order (linear) or even higher order. Thus, for example, in some embodiments of the invention, a misalignment of a lens is corrected by stretching the lens in a lens holder, effecting a first order alignment correction. An exemplary zero order correction is by moving and/or rotating the lens array. An exemplary second order correction is by providing multiple calibration screws along the lens, to allow twisting the lens array.

In some embodiments of the invention, a casing of the lens array display comprises an adjustment unit which is coupled to the indicia and/or the lens array. When a new indicia is inserted to the casing, the adjustment unit is used to align the indicia with the lens array. In some embodiments, the adjustment unit comprises a motor. Optionally, the motor (and/or at least some of its control circuitry) is detachable, and carried by people who service the displays and/or replace indicia. Alternatively or additionally, the adjustment motor is remotely controlled, for example allowing a person to view the display from a distance while performing alignments. In some embodiments, the transmission of the control signals to the motor is effected through wires, in others by wireless means, such as analog or digital electromagnetic radiation or ultrasonic signals.

In some embodiments of the invention, the lens array display comprises at least one alignment sensor which detects misalignments. In some embodiments of the invention, the at least one alignment sensor provides adjustment indications to the adjustment unit which automatically aligns the indicia responsive to the indications. Alternatively or additionally, the alignment sensor alerts a service person that the lens array display is misaligned, for example a local service person or a remote service person, optionally using a communication device (e.g., a cellular telephone or a radio).

In some embodiments of the invention, the alignment sensor comprises a camera which views a portion of the indicia through the lens array and circuitry, e.g., a processor, which determines whether the image viewed by the camera is acceptable. In some embodiments of the invention, the indicia have a test image printed on one of their corners (and/or at other locations thereof), and the camera is directed toward the test image.

In some embodiments of the invention, the lens array comprises a plurality of lens arrays. In such a case, a possible alignment is the relative alignment of the different lens arrays.

An aspect of the some embodiments of the invention relates to using a lens array of a single size for different magnification ratios of the displayed image, thus allowing different strip widths (and/or picture numbers) to be accommodated in a single device. In some embodiments of the invention, a casing of a lens array display comprises a plurality of slots for receiving the indicia at different distances from the lens array. Alternatively or additionally, the casing has a plurality of slots for inserting the lens array at different distances from the indicia. Alternatively or additionally, the distance between the indicia and the lens array is adjustable, for example using a screw mechanism.

An aspect of some embodiments of the invention relates to providing means of holding the indicia carrier substantially in place on the indicia carrier holder. For example, tensioning rods and/or spring devices are employed to reduce the freedom of motion of the indicia carrier, and to ensure that despite temperature changes the indicia is always taut and/or at the correct distance and/or correct orientation from the lens array.

An aspect of some embodiments of the present invention relates to using a relatively low precision lens array in a lens array display. In some cases, the use of lower precision will allow a lens array to be provided at a lower cost than previously considered possible.

In some embodiments of the invention, the low precision lens array is mounted in a casing which allows adjustment of the distance between the lens array and the indicia. The distance between the lens array and the indicia is adjusted so as to minimize the affect of the low precision lens array on the quality of the image displayed by the lens array display. In some embodiments of the invention, the adjustment is performed each time a new indicia is inserted to the casing. Alternatively, the adjustment is performed once for each lens array.

In some embodiments of the invention, the indicia are printed responsive to the properties of a specific lens array in which they are to be displayed. For example, if the lens array has a left tilt, the indicia is printed with a compensating or matching tilt. In some embodiments of the invention, a list of properties is produced for each lens array after its production. In printing a batch of indicia for a plurality of lens array displays, each indicia is printed separately with compensation properties matching the properties of the lens array with which the indicia is to be displayed. In some embodiments of the invention, each indicia is printed with identification of the lens array with which it is to be used, for example on a back side of the indicia.

In some embodiments of the invention, indicia are printed with redundant zones which compensate for the low precision of the lens array. In some embodiments of the invention, each strip of the indicia is printed twice in the indicia, such that, if the lens array slightly deviates in one direction, a portion belonging to the same image will be displayed rather than a portion from a strip belonging to a different image. Alternatively, each strip has a width wider than is meant to be displayed and the printed strips overlap. In case the lens array deviates from its planned orientation it will display a portion of the same image, rather than a portion of a different image.

An aspect of some embodiments of the present invention relates to a lens array display in which the motion function of the indicia relative to the lens array is controllable. In some embodiments of the invention, a maintenance person may set the rate at which the displayed images change. In some embodiments of the invention, the display time of different images may be different, such that some images are displayed for longer periods than others. Alternatively or additionally, some images are displayed (or their display time varied) at certain hours while others are displayed at other hours. For example, at times in which children are expected to pass near the display, advertisements directed to young consumers are displayed at a high intensity and/or display time, while at other times advertisements directed to older consumers are displayed with a high intensity and/or display time. Alternatively or additionally, the image step is modified, for example for calibration purposes. It should be noted that a plurality of images can be provided on a single indicia, with only some of the images being used for display cycling at any given time, by suitable controlling the motion function.

In some embodiments of the invention, the motion function of the indicia is planned to operate using a redundancy pattern of the indicia to compensate for low precision of the lens array. In some embodiments of the invention, in inserting an indicia, a maintenance person enters a motion function of the indicia into a controller. Alternatively or additionally, the controller automatically reads an indication of the motion function which should be used, from the indicia, for example, using a bar-code. Alternatively or additionally, the display may be remotely controlled and/or programmed. Additional or alternative indications, such as bar-codes, may be provided to mark strips and/or for providing other programming information to the display device.

An aspect of the present invention relates to using large width lenses in a cylindrical array, for example lens having a width of above 11 mm, particularly above 15 mm. In some cases, the use of such wide lenses allows the use of relatively low precision indicia, for example 24 Dots Per Inch, so that lower resolution indicia printing methods may be used. In some cases, the use of lower precision indicia will allow the indicia to be provided at a lower cost than previously considered possible. The lens may be a Fresnel lens array or a plain lens array, for example.

An aspect of some embodiments of the present invention relates to a lens array display kit for installing in existing (e.g., non-alternating) display casings. In some embodiments of the invention, the lens array and indicia are packaged together in a manner which allows easy attachment to the existing display casing. In some embodiments of the invention, the display kit also includes a drive mechanism for driving the indicia and/or lens array and/or an adjustment unit. Optionally, the display kit comprises a lens array and an indicia holder which are fixedly oriented relative to each other. Alternatively, the lens array display kit allows simple orientation of the lens array and indicia holder within the existing casing. In one exemplary embodiment, the display kit includes lighting apparatus. Alternatively or additionally, lighting apparatus is provided by an existing casing of the display.

An aspect of some embodiments of the present invention relates to providing a weather-proof multi-image display device, for example a display device resistant to precipitation, condensation and/or extremes of temperature or solar illumination. In an exemplary embodiment of the invention, the display device is designed to take into account the effect of heat fluctuations, for example by controlling the direction of expansion, by providing a same amount of expansion for the lens, indicia carrier, indicia frame and/or drive mechanism and/or by compensating for environment-related distortions. A temperature sensor may optionally be provided for modifying the drive mechanism. Alternatively, the drive mechanism may operate in a closed loop with the indicia, for example using an optical sensor, moving one strip disregarding the original width of the strip. Alternatively or additionally, an internal heater (with an optional thermostat) is provided, for example for heating the casing, lens, motion mechanism, alignment mechanism and/or indicia carrier. Such a heater may be, for example, a point heater or a surface heater, for example, a flat coil. For example, the display device may be designed to withstand temperature ranges of 10° C., 20° C., 30° C., 40° C. or more, with temperature extremes, for example, of −20° C. and +40° C. Also high humidity levels and humidity level extremes may be supported, for example, 80%, 90% or high relative humidity and extremes from of less than 30% or 15% humidity to above 90% humidity.

Alternatively or additionally, the positioning of the indicia relative to the lens is such that light from the sun does not focus on the indicia, for example, the indicia being more than one or even two focal lengths away from the lens. However, this is not required.

Alternatively or additionally, the lens array is provided with an anti-sun coating, to reduce the intensity of incoming light. Alternatively or additionally, a light collimator may be provided, to prevent light from impinging on the indicia from angles at which sunlight is expected. Alternatively or additionally, the lens are formed with expansion holes or slot to accommodate temperature expansion effects and/or to prevent condensation or allow it to escape.

There is this provided in accordance with an exemplary embodiment of the invention, a display device for displaying a plurality of changing images, comprising:

a multi-image indicia carrier having a plurality of images formed thereon, each of said images being formed as a plurality of sections;

an image selector adjacent said carrier that selectively presents the sections relating to at least one image, thereby displaying said at least one image;

a motion train that effects said selection by providing relative motion between said indicia carrier and said image selector; and at least one alignment element that adjusts at least one of said motion train and a relative arrangement of said indicia carrier and said image selector. Optionally, said image selector comprises an array of lens, each of said lens selectively presenting at least one of said sections. Optionally, said array comprises a one-dimensional array of cylindrical lens.

In an exemplary embodiment of the invention, said display comprises an indicia frame to which said indicia carrier is attached. Optionally, said indicia is inserted into said frame. Alternatively or additionally, said indicia is pasted onto said frame. Alternatively or additionally, said indicia is mechanically attached to said frame.

In an exemplary embodiment of the invention, said motion train mechanically couples said frame to said image selector and provides relative motion therebetween. Alternatively, said motion train mechanically couples said indicia carrier to said image selector and provides relative motion therebetween.

In an exemplary embodiment of the invention, said alignment element aligns said frame relative to said image selector.

In an exemplary embodiment of the invention, said frame is moved from a position adjacent said image selector for loading of a carrier into said frame.

In an exemplary embodiment of the invention, said motion train moves said image selector.

In an exemplary embodiment of the invention, said indicia carrier is substantially rigid. Alternatively, said indicia carrier is flexible.

In an exemplary embodiment of the invention, said indicia carrier comprises a plurality of parts. Alternatively, said indicia carrier is provided as a single part.

Alternatively or additionally, said alignment element adjusts a distance between said indicia carrier and said image selector. Alternatively or additionally, said alignment element adjusts an orientation angle between said indicia carrier and said image selector. Alternatively or additionally, said alignment element adjusts an in-plane offset between said indicia carrier and said image selector. Alternatively or additionally, said alignment element adjusts a magnification of said image selector. Alternatively or additionally, said alignment element adjusts a rate of motion of said motion train. Alternatively or additionally, said at least one alignment element adjusts an amount of motion of said motion train.

In an exemplary embodiment of the invention, said alignment is uniform for all of said display. Alternatively, said alignment is different for different parts of said display. Optionally, said alignment is limited to adjusting one degree of freedom of said display.

In an exemplary embodiment of the invention, said at least one alignment element aligns in at least two degrees of freedom of said display. Alternatively or additionally, said at least one alignment element comprises at least one spacer screw. Optionally, said display device comprises at least one motor to turn said spacer screw.

In an exemplary embodiment of the invention, said at least one alignment element comprises a driving element constrained to move in one dimension. Alternatively or additionally, said at least one alignment element comprises a rod with a plurality of slots, each slot corresponding to an alignment configuration. Alternatively or additionally, said at least one alignment element is adapted to correct for temperature-caused distortions. Alternatively or additionally, said at least one alignment element is adapted to correct for distortions caused by indicia creation. Alternatively or additionally, said at least one alignment element is adapted to correct for distortions caused by image-selector manufacture. Alternatively or additionally, the display device comprises at least one tensioning element for maintaining a tension in said indicia carrier. Optionally, said at least one tensioning element comprises at least one of a rod and a spring.

In an exemplary embodiment of the invention, the display device comprises a controller for effecting automatic alignment of said display device. Optionally, said controller comprises a camera for imaging at least one of said images. Alternatively or additionally, said controller comprises a sensor for detecting at least one marking on said indicia carrier.

In an exemplary embodiment of the invention, said controller is continuously active.

In an exemplary embodiment of the invention, the display device comprises a manual remote control for effecting alignment of said display device. Optionally, said remote control is adapted to be used within a viewing distance of said display. Alternatively, said remote control is adapted to be used outside of a viewing distance of said display.

In an exemplary embodiment of the invention, at least a part of said at least one alignment element is removable after alignment. Alternatively or additionally, said alignment element is used to select at least one image not to display. Alternatively or additionally, said alignment element is used to select at least one motion profile to match a time or a date.

In an exemplary embodiment of the invention, said image selector presents said image as a presentation having a surface of at least 0.5 square meters. Alternatively or additionally, said image selector presents said image as a presentation having a surface of at least 1 square meters. Alternatively or additionally, said image selector presents said image as a presentation having a surface of at least 2 square meters. Alternatively or additionally, said image selector presents said image as a presentation having a surface of at least 4 square meters. Alternatively or additionally, said image selector presents said image as a presentation having a surface of at least 9 square meters.

In an exemplary embodiment of the invention, said display is adapted to fit onto a static display device.

In an exemplary embodiment of the invention, said display is adapted to withstand an outdoor environment. Optionally, said display is adapted to operate over a range of outdoor temperatures. Alternatively or additionally, said display includes vents for excess humidity. Alternatively or additionally, said display includes a heater. Alternatively or additionally, said display includes protection of said-indicia carrier from direct sun. Alternatively or additionally, a temperature-related distortion of said indicia matches a temperature-related distortion of said image selector. Alternatively or additionally, a temperature-related distortion of said display device is directed by a structure of said display to be expressed in a manner that reduces presentation distortion.

In an exemplary embodiment of the invention, said image selector comprises a plurality of parts. Optionally, said alignment element provides relative alignment between said plurality of image selector parts.

In an exemplary embodiment of the invention, said image selector comprises a panel defining a plurality of holes.

There is also provided in accordance with an exemplary embodiment of the invention, a method of image display, comprising:

providing a non-optimal display device for displaying a plurality of images and having an alignment mechanism;

providing a non-optimal indicia carrier formation process, for generating indicia that carry said plurality of images; and controlling at least one of said formation process and said alignment to provide an acceptable presentation of images on said device. Optionally, said controlling comprises controlling said formation process. Alternatively or additionally, said controlling comprises controlling said alignment. Alternatively or additionally, said matching is to a particular display device having known characteristics. Alternatively or additionally, said display device comprises an array of cylindrical lens used to select which image to present and wherein said cylindrical lens are at least 11 mm wide. Optionally, said lens are at least 15 mm wide.

In an exemplary embodiment of the invention, the method comprises selecting an indicia carrier material that has a desired expansion characteristic.

There is also provided in accordance with an exemplary embodiment of the invention, a large display device for displaying a plurality of changing images, comprising:

a multi-image indicia carrier having a plurality of images formed thereon, each of said images being formed as a plurality of sections;

an image selector adjacent said carrier that selectively presents the sections relating to at least one image, thereby displaying said at least one image; and a motion train that is operative to provide relative motion between said indicia carrier and said image selector, thereby effecting said selection, wherein said display device is adapted to operate acceptably in an outdoor environment.

There is also provided in accordance with an exemplary embodiment of the invention, a large display device for displaying a plurality of changing images, comprising:

a multi-image indicia carrier having a plurality of images formed thereon, each of said images being formed as a plurality of sections;

an image selector adjacent said carrier that selectively presents the sections relating to at least one image, thereby displaying said at least one image; and a motion train that is operative to provide relative motion between said indicia carrier and said image selector, thereby effecting said selection, wherein said display device is adapted to be fit into an existing static display device.

BRIEF DESCRIPTION OF THE DRAWINGS

The present invention will now be described in the following detailed description of exemplary embodiments of the invention and with reference to the attached drawings, in which same or similar number designations are maintained throughout the figures for each element and in which dimensions of components and features shown in the figures are chosen for convenience and clarity of presentation and are not necessarily shown to scale. Generally, only structures, elements or parts that are germane to the discussion are shown in the figures. The figures are listed below.

DETAILED DESCRIPTION OF SOME EMBODIMENTS

Figure 1A:
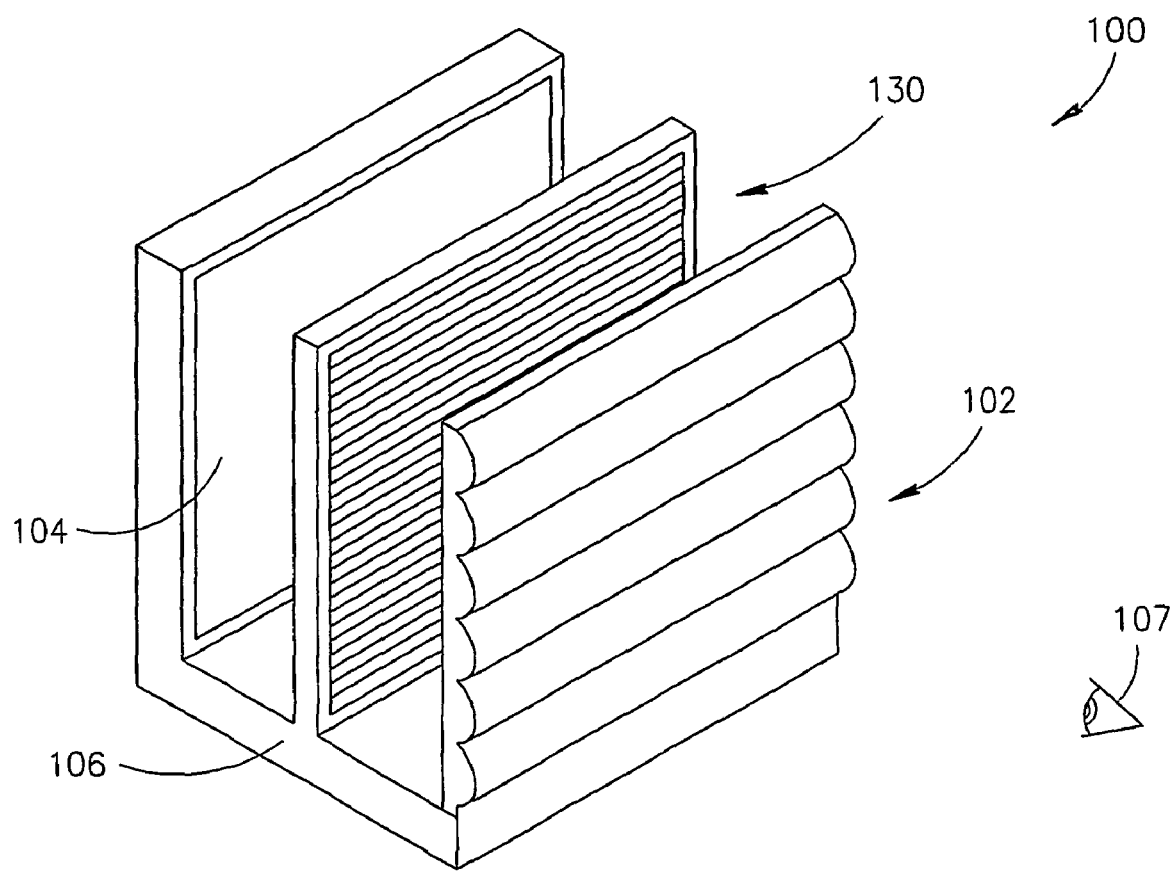
FIG. 1A is a blown-up schematic view of some of the elements of a cylindrical lens multi-image display mechanism.

FIG. 1A schematically illustrates, in blow-up view, a portion of a multi-image display device 100, in accordance with an exemplary embodiment of the invention. Display device 100 may be of substantially any size. It is noted, however, that the features of display device 100 described hereinbelow, facilitate the use of display device 100 for displaying images larger than one square meter or even larger than four square meters.

In some embodiments of the invention, multi-image display device 100 is adapted for use as a street sign. Optionally, display device 100 has a weather proof casing (not shown) which protects the display device from outdoor conditions, such as temperature changes, rain, snow and vandals.

Coupled to a fixed frame 106 are a cylindrical lens array 102 and an indicia carrying frame 130. Frame 130 carries an indicia, encoding a plurality of images, printed on indicia carrier 110. FIG. 1C shows an exemplary indicia 110, and FIG. 1D and FIG. 1E show respectively the two pictures encoded in indicia 110. On the indicia in FIGS. 1C, 1D and 1E markings M1 and M2 are visible. Markings M1 and M2, which are made for the purpose of manually and/or automatically aligning indicia carrier 110, are related to below.

The images encoded in the indicia are seen by a viewer indicated by an eye 107 looking through lens array 102. In order to switch the image viewed by the viewer, indicia carrier 110 (shown in FIG. 1B) moves relative to lens array 102. In some embodiments of the invention, indicia frame 130 moves relative to fixed frame 106 and lens array 102. Alternatively or additionally, lens array 102 moves relative to fixed frame 106 and indicia frame 130. Further alternatively or additionally, indicia carrier 110 moves relative to indicia frame 130.

An optional light source 104 illuminates indicia carrier 110 from behind. Alternatively or additionally, light sources are located between indicia carrier 110 and lens array 102 and/or before lens array 102 and/or on a side of frame 106. Further alternatively, device 100 does not include an internal illumination source, for example using ambient reflected or transmitted light.

Figure 1B:
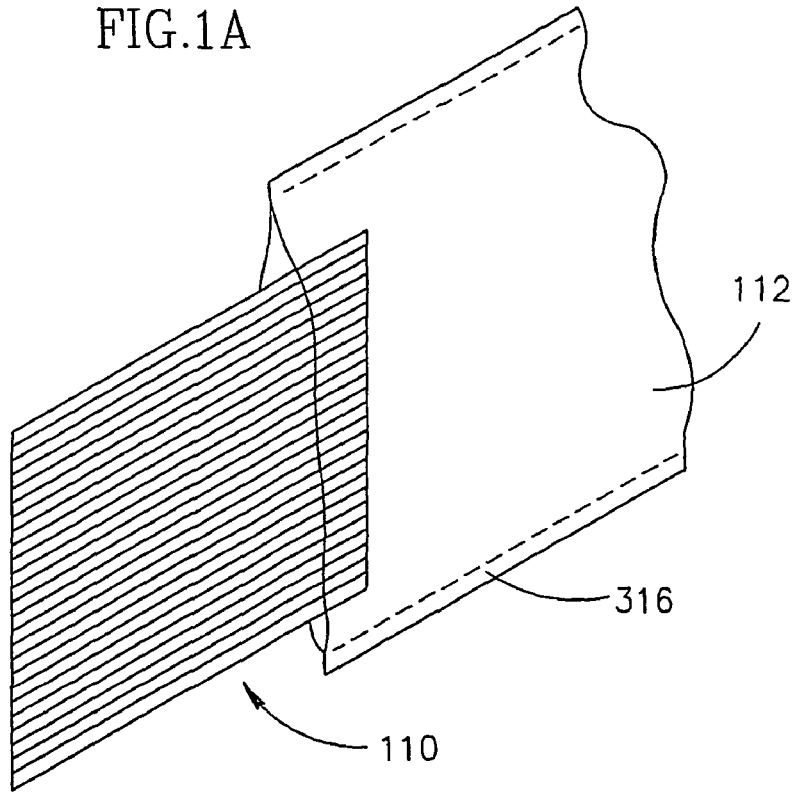
FIG. 1B is a schematic drawing of an indicia carrier partially inserted into an indicia carrier holder, in accordance with an embodiment of the invention.
Figure 1C:
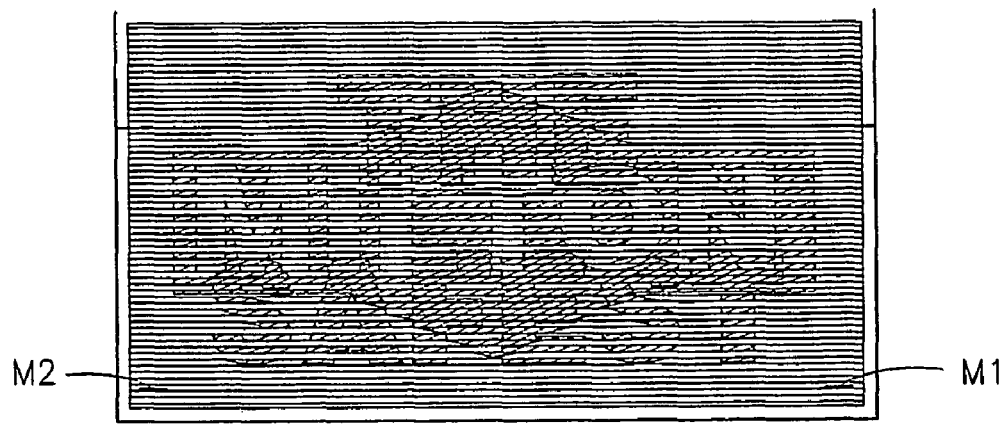
FIG. 1C represents an indicia for the display of two pictures, in accordance with an embodiment of the invention.
Figure 1D:
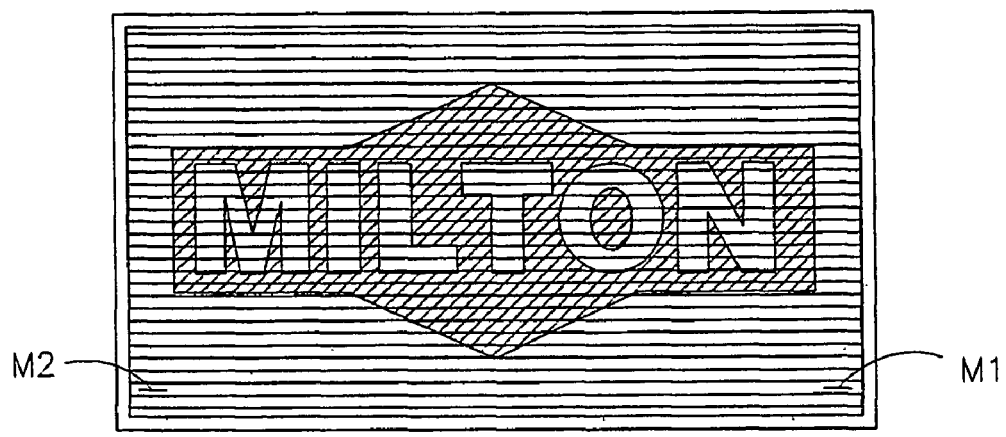
FIG. 1D is one of the pictures encoded in the indicia of FIG. 1C.
Figure 1E:
FIG. 1E is the other of the pictures encoded in the indicia of FIG. 1C.

FIG. 1B is a schematic illustration of indicia carrier 110 within an indicia carrier holder 112, in accordance with an exemplary embodiment of the present invention. In some embodiments of the invention, indicia carrier holder 112 comprises an envelope, transparent at least on the side which lies between indicia carrier 110 and lens array 102. The other side is optionally translucent, to diffuse the light which illuminates the indicia from behind. In some embodiments of the invention indicia carrier holder 112 utilizes such a structure to enable quick change of indicia carrier 110. In some embodiments of the present invention, there are sleeves 316 at the edges of indicia carrier holder 112, by which indicia carrier holder 112 is held in place.

In some embodiments of the invention, indicia carrier 110 is removably located within indicia carrier holder 112 so that it can speedily be replaced. Sometimes indicia carrier 110 is free in indicia carrier holder 112, held merely by friction. Alternatively indicia carrier 110 is held in place inside indicia carrier holder 112 by mechanical means, for example clamps. Alternatively or additionally, indicia carrier holder 112 may be equipped with a holding and/or clamping mechanism. In some embodiments indicia carrier 110 is attached to indicia carrier holder 112 at multiple points to allow stretching, for example in a case where expansion of lens array 112 is allowed for. Alternatively or additionally, indicia carrier holder 112 is removably held by indicia frame 130.

In some embodiments of the invention, indicia frame 130 comprises an alignment mechanism, as described below. Indicia frame 130, upon insertion of a new indicia carrier 110 into indicia carrier holder 112, aligns the axes of indicia 110 parallel to the focal axes of lens array 102.

Figure 2:
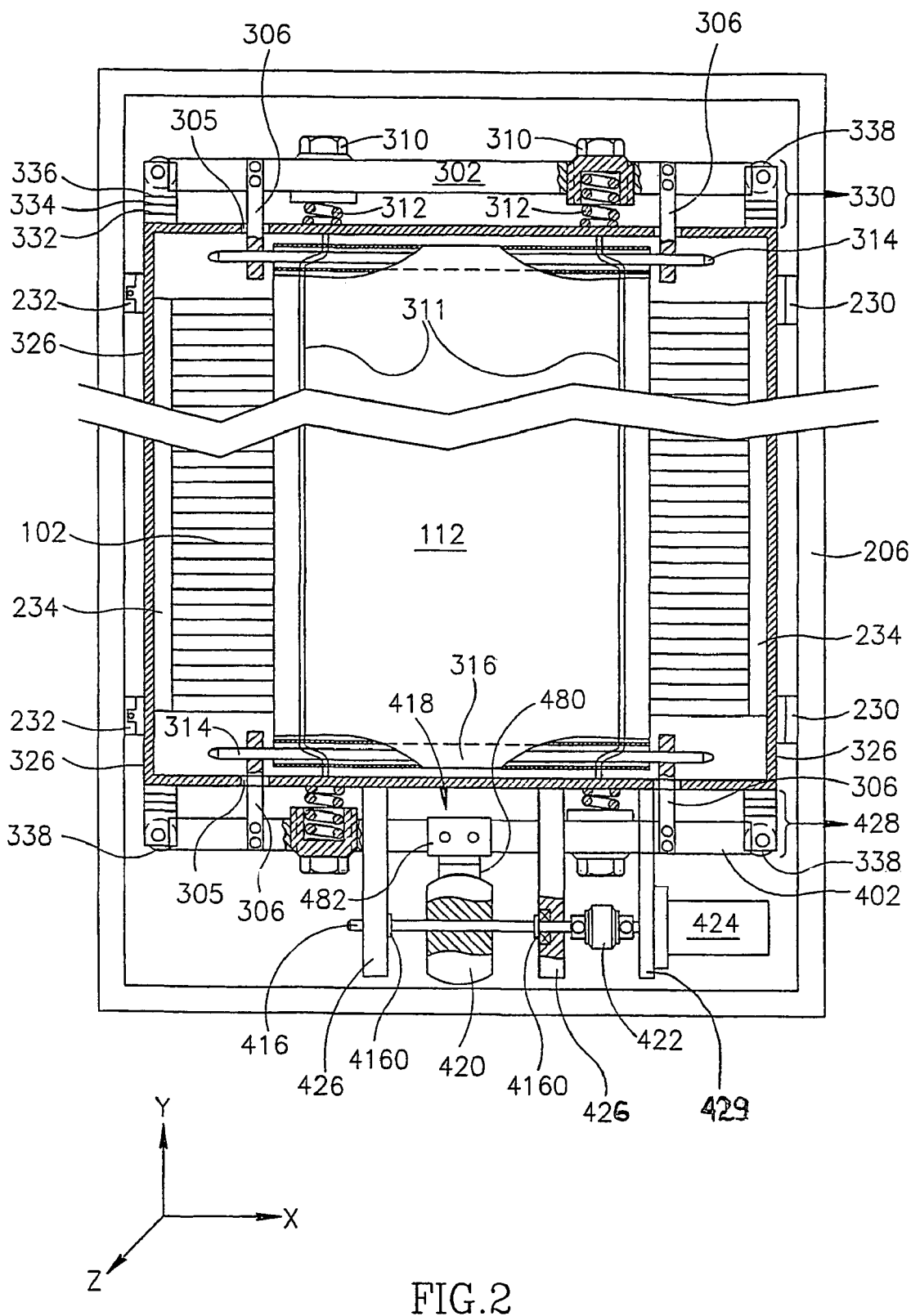
FIG. 2 is a schematic drawing of the indicia carrying frame in accordance with an embodiment of the invention.

FIG. 2 is a schematic illustration of the rear side of some embodiments of the present invention, which can fit into an existing street sign housing 206. One can see sections of lens array 102, partially hidden indicia carrier holder 112. Lens array 102 is, for example, firmly but elastically held by lens holders 234 which are fastened to frame 326. The elasticity of lens holders is optionally obtained by lens holders 234 having a rubber lining. Thus lens array 102 may expand or contract with temperature changes. Optionally lens array 102 is non-elastically held at least on one or two sides, thus directing the expansion and contraction of lens array 102. Lens holders 234 may also serve to damp vibrations, for example from roadways or wind. Alternatively or additionally, other vibration dampers may be provided. Optionally, the vibration response characteristics of the indicia carrier and of the lens are matched, for example, by matching the weight and/or adding dampers, as known in the art of damping, so that they will have a similar response. Alternatively or additionally, the indicia and the lens are coupled so that they will vibrate in synchrony.

In one embodiment of the invention, the lens are stretched by the lens holder, in order to effect a matching of the lens to the indicia carrier. The stretching may be, for example, active, for example using a motor that stretches the lens holder. Alternatively or additionally, the stretching is passive, for example by manual screws. The stretching may be uniform. Alternatively, a plurality of screws are provided in the frame, to allow different stretching of different parts of the lens. Optionally, differential tightening of the screw can be used to effect various distortions and rotations of the lens, for example, with some screws controlling an in-plane displacement of the screwed portion and other screws controlling an out-of-plane displacement. Optionally, the lens are pre-stretched to the geometry caused by a given temperature.

It should be noted that aligning frames rather than lens and indicia carriers may be desirable in some embodiments, as stress on functioning elements is thus reduced and/or evenly distributed.

In an exemplary embodiment of the invention, the lens are provided as multiple lens sections. Each such section is optionally aligned and/or distorted on its own. Alternatively or additionally, alignment between the different sections is provided, for example, each section being held by a different lens holder, with an inter-lens holder alignment mechanism provided.

Frame 326 is connected by fasteners 230 and fasteners 232 to housing 502. Optionally fasteners 230 are hinge sections which fit the door hinges of a previously existing street sign. In some exemplary embodiments, the original door is removed, as is the light diffusing panel if such panel exists, and the upgrade display unit of the present invention is inserted to the existing housing. The inserted display unit is fastened, for example, by using the existing door hinges, as stated above, on one side, and fasteners 232 on the other. Fasteners 232 are preferably operated by a screw which presses a part of fastener 232 against the side of existing frame 206. Alternatively or additionally, other fastening means, such as clamps or pressure fittings may be used.

An indicia carrier drive mechanism described in the following paragraphs moves indicia carrier holder 112 within fixed frame 326, thus changing the images seen by the viewer. The type of drive mechanism may vary between different implementations, for example, being electrical motor, solenoid, linear actuator, piezoelectric, pneumatic, hydraulic, spring operated, weight operated, pendulum operated and/or clockwork operated drive mechanisms. The power source can be, for example, line, battery or solar electrical power, wind power and/or mechanical power, for example internal as a spring or external, as vibrations.

The indicia carrier drive mechanism, which raises and lowers lower bar 402, optionally comprises a motor 424, coupling 422, drive shaft 416, cam 420, and cam follower 418. These parts are supported from fixed frame 326 by drive shaft supports 426 and motor support 429. Two retaining devices, for example Circlips 4160, one on each side, keep drive shaft 416 in place. Cam follower 418 is a slider assembly made of two pieces. Part 480, which has a preferably spherical surface, is in contact with preferably spherical cam 420. Part 482 is attached to lower mechanism bar 402 which is otherwise analogous to upper bar 302. As motor 424 turns cam 420, lower bar 402 is raised and lowered relative to fixed frame 326, raising and lowering holding pieces 306 which pass through openings 305 in fixed frame 326. Holding pieces 306 hold bars 314 which pass through sleeves 316 at he edges of indicia carrier holder 112. The resulting motion of indicia carrier 110 held in indicia carrier holder 112 relative to fixed frame 326—and hence relative to lens array 102—changes the particular picture encoded in the indicia which is currently displayed, and the viewer sees a different image. Indicia carrier holder 112 is optionally kept in tension during the motion, for example, by springs 312 and/or by tension rods 311. Tension rods 311 are optionally tightened by screw mechanisms or other means as known in the art.

FIG. 2 also shows an upper mechanism 330, in accordance with an embodiment of the present invention. Optionally, bar 314 is attached to an upper bar 302, for example, by two support bars 306 which pass through openings in frame 326. Two sets of special nuts 310 and optionally springs 312 connect upper bar 302 to structural element 326. Nuts 310 screw into screw-holes in bar 302 and 402, and pass through bars 302 and 402 respectively. Springs 312 are firmly connected to frame 326, preferably by welding one end. The other end of springs 312 are moveably located inside a recess in special nut 310. Thus, nut 310 and spring 312 form an adjustable screw mechanism held in tension by spring 312. This screw mechanism both holds indicia carrier holder 112 in tension to prevent slippage and/or disorientation and enables aligning of indicia carrier 110. When the two adjustable screw mechanisms are tightened equally, the distance between fixed frame 326 and upper bar 302 is reduced. However: if 310 are unequally tightened, upper bar 302 turns around the Z axis. When upper bar 302 turn around the Z axis—indicia carrier holder 112 is rotated, and the orientation of the axes of the indicia relative to the focal axes of lens array 102 is changed.

FIG. 2 also shows a lower mechanism 428, in accordance with an embodiment of the present invention. The lower mechanism 428 in FIG. 2 contains parts substantially equivalent to those of upper mechanism 330, and have been identified with the same numerals.

In some embodiments of the invention, upper bar 302 and lower bar 402 are, on both sides, in contact with pulleys 338. Bars 302 and 402 move in the Y direction within slots of pulleys 338. Pulleys 338 are adjustably fastened to structural element 326 via adjustment pieces 332, 334 and 336. Pieces 332, 334 and 336 respectively control adjustment of the end of bars 302 and 402 in the directions of the X, Y and Z axes relative to frame 326, as hereunder. Piece 336 can turn around the Y axis. Piece 336, in turn, is connected to Piece 334. Piece 334 can be moved along the Z axis. Piece 334 is connected to Piece 332; Piece 332 can be moved along the X axis. Piece 332, 334 and 336 together enable the adjustment of upper bar 302 with regard to three degrees of freedom: X, Z and $\partial y$ (the angle of turning around the Y axis).

In some embodiments, a corner fastener is used instead of pieces 332, 334 and 336. With this method frame 106 may be quickly disassembled.

The need for adjustment or relative orientation of the parts of the display apparatus mechanism may result, for example, due to imperfections of the original manufacture of the display device, by handling caused by indicia changing, by physical impact on the display device, by road vibrations and/or by temperature changes. The misalignment may be, for example, misalignment of the structure of the display device.

In particular, the misalignment may include, for example, the indicia carrier not being parallel to the lens array, and/or misalignment of the lens in the display unit, and/or misalignment of the direction of the relative motion between the lens array and the indicia carrier. Alternatively or additionally, the misalignment may be caused by inaccurate placement of the indicia carrier when the pictures are changed. Misalignment may be attributable to imperfections in an indicia preparation process. Additionally or alternatively, any one or any combination of the following parameters may be outside their respective tolerances: the distance between the indicia and the lens, the relation of the width of the linear segments on the indicia and the distance between focal lines of the lens, the matching of the distance between linear segments and the amount of motion of the lens for picture changing.

Figure 3:
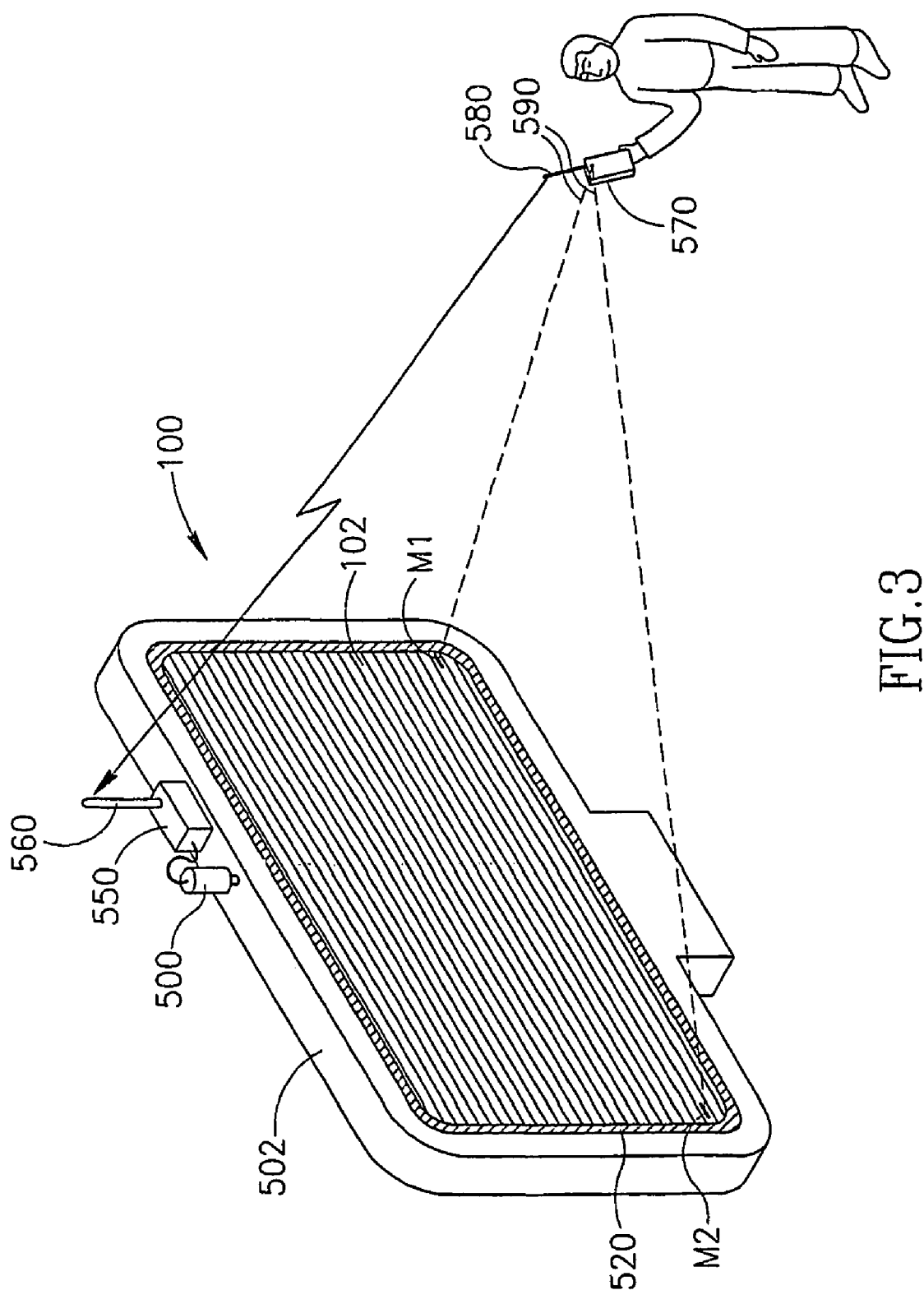
FIG. 3 shows a general view of a street display unit which is fitted into an existing street sign, being aligned after indicia carrier change, in accordance with an embodiment of the invention.

In some embodiments of the invention, the alignment of indicia carrier holder 112 (not shown in the figure) is effected as shown in FIG. 3. FIG. 3 shows a street sign 100 in which indicia carrier 110 (not shown in the figure) has just been changed or is unaligned for other reasons. It is noted that the direction of insertion of the indicia carrier may be parallel or perpendicular to the lens axis. Alternatively or additionally, the lens may be opened as a hinged door and the indicia carrier placed in the frame.

In some embodiments, the axes of the lens elements of cylindrical lens array 102 are horizontal, as shown in FIG. 3. In such an embodiment the motion of indicia carrier 110 is typically vertical. Alternatively the axes of the lens elements of cylindrical lens array 102 are vertical, and the motion of indicia carrier 110 is, for example horizontal; Some embodiments use cylindrical lens arrays which are neither vertical nor horizontal, but whose lens axes are diagonal and/or curved.

In FIG. 3, the street sign displays an exemplary indicia carrier with two marks: M1 and M2, located close to the edges of the indicia carrier, yet in the area visible through lens array 102, in accordance with some embodiments of the present invention. The straight line between Marks M1 and M2 are substantially parallel to the axes of the strips which comprise the indicia. Marks M1 and M2 are printed on indicia carrier 110, in some embodiments, by an additional printing process after finishing the printing of the indicia, although in an exemplary embodiment marks M1 and M2 are printed or deposited by the same process which encodes and prints the indicia. One method is to code for marks M1 and M2 in the computer program which prints the indicia, for example using the printing process described in U.S. Pat. No. 5,100,330, the disclosure of which is incorporated herein by reference.

When M1 and M2 are both visible through the same lens of lens array 102, indicia carrier 110 is properly aligned. In some embodiments, the function of viewing marks M1 and M2 and deciding in which direction to turn nut 310 can be effected by a remote control device 570. Control unit 570 is held by the service person. Control device 570 transmits signals generated by a signal generating device, which is optionally part of control device 570, to a signal receptor 560. The signal received by signal receptor 560 is decoded by control device 550. Control device 550 sends impulses to servo-motor 500 which effects the alignment of indicia carrier 110 as described hereunder.

Servo-motor 500 shown in FIG. 3, turns (by a mechanism not shown) one or more of nuts 310 (for example as shown in FIG. 2) or other alignment mechanism that may be used, responsive to a command received as described above. In some embodiments of the invention, the screw turning commands are issued remotely. Thus, when display device 100 comprises a street sign, a person aligning indicia carrier 110 may issue commands to turn one of the nuts 310 while standing at a distance from display device 100. For example, the user may stand at a distance from display device 100 which allows the user to see the entire display device at once and to notice a possible misalignment of the indicia relative to lens array 102.

In some embodiments of the present invention, control unit 570 has sensors 590 which sense the positions of marks M1 and M2. In some embodiments of the present invention a calculating unit, which may be housed in control unit 570, calculates the correcting movement necessary to align indicia carrier 110. In some embodiments of the present invention the needed correcting movement as calculated is displayed for the user. In some embodiments a sending device 580 which may be housed in control unit 570, sends appropriate control signals through signal sending device 580 to motor control device 550.

Alternatively or additionally to providing alignment marks, instructions may be printed on the indicia carrier. Such instructions may be, for example instructions to the installer, for example for manual calibration, parameter set-up and/or target display device. Alternatively or additionally, the instructions may be for an automated calibration controller, for example in machine readable form such as bar-codes. For example, the instructions can include one or more of initial alignment settings, desired magnification, motion profile (e.g., image order, display time), expected alignment quality, existence and/or type of alignment marks, printing process used and/or lens properties.

In some embodiments, the front surface of an existing display 502 is replaced by the present invention, as shown in FIG. 3. A connecting element, such as a gasket, preferably a standard gasket, or a cowling 520 connects fixed frame 106 (of FIG. 2, not visible in FIG. 3) to a housing of existing street sign 502. Additionally or alternatively, frame 106 has attachment devices to attach to the housing. Connecting element 520 optionally weatherproofs the street sign, and, optionally having baffles, allows humidity to escape.

Different levels of integration may be provided, with the display sharing various elements with the existing signs. For example, the sign and the display can share one or more of a base, a frame, power sources, lighting elements, remote controls and/or a processor.

Optionally, the display device is designed to fit into existing standard sign sizes. Alternatively, an adjustable coupling element 520 is used.

Figure 4:
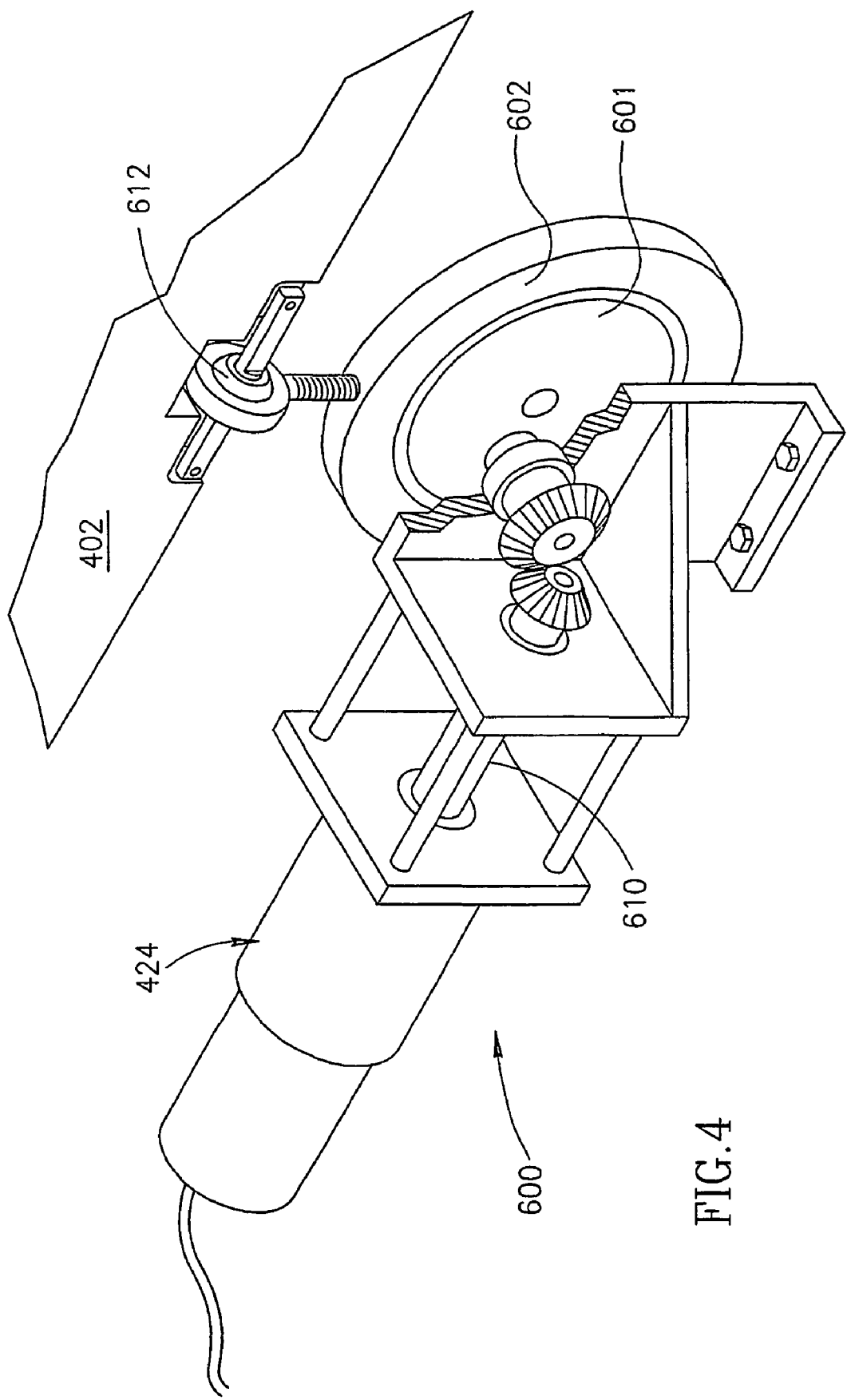
FIG. 4 shows an alternative drive mechanism, using a universal joint, in accordance with an embodiment of the invention.

FIG. 4 is a schematic illustration of an exemplary display drive mechanism 600, in accordance with an embodiment of the present invention. Display drive mechanism 600 may be used instead of cam 420 which was described above with reference to FIG. 2. Drive mechanism 600 includes a cam 601, optionally a circular disk, which is eccentrically mounted on a drive shaft 610 of a drive motor 424. A sliding ring 602 is mounted on cam 601, and the handle of a universal joint 612 is screwed into sliding ring 602. A ball end of universal joint 612 is connected to lower bar 402, which moves indicia carrier holder 112. Alternatively, cam 601 is indirectly coupled to drive shaft 610.

Figure 5:
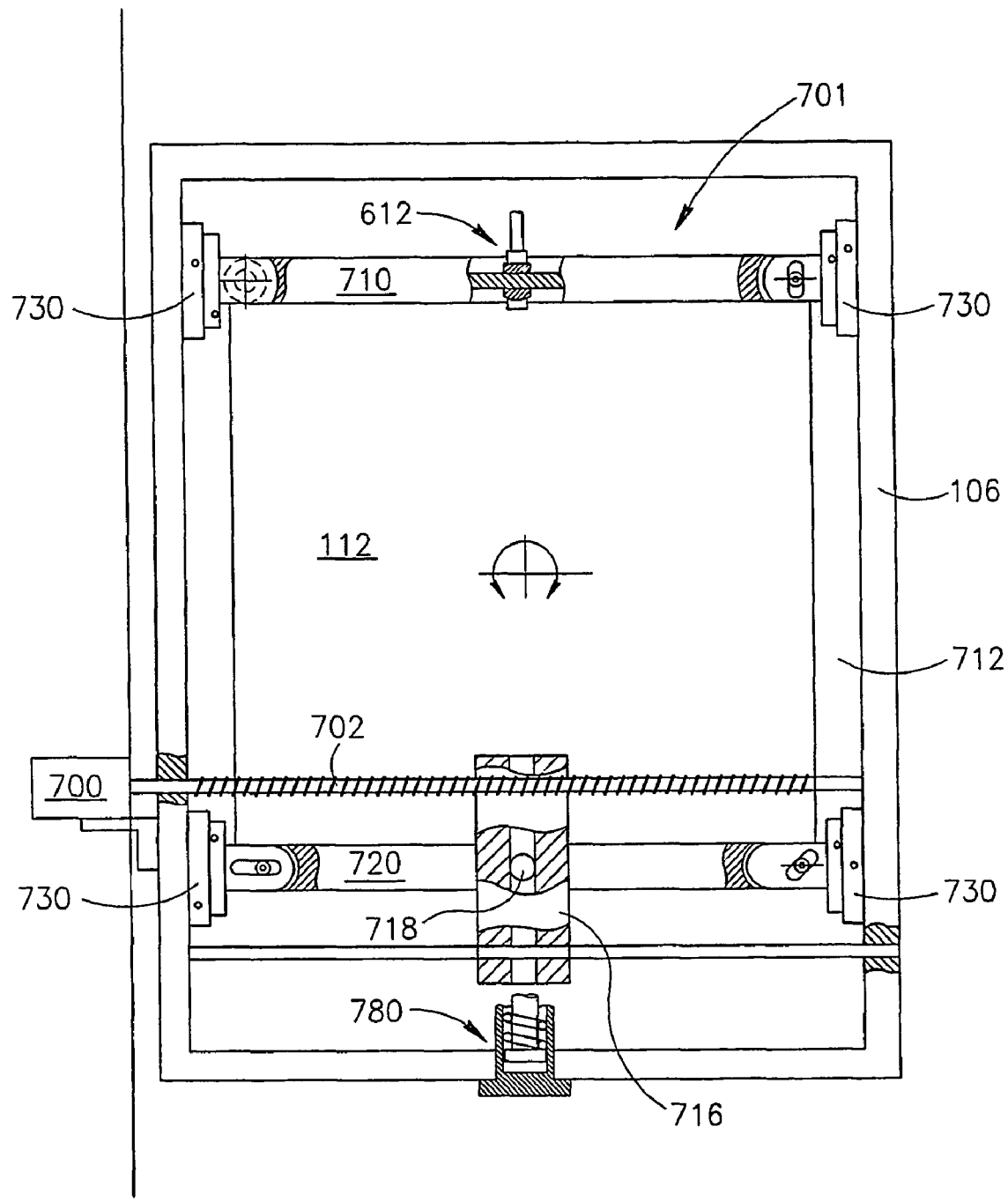
FIG. 5 is a schematic view of a second embodiment using a worm screw assembly for alignment correction, in accordance with an embodiment of the invention.

FIG. 5 is a schematic illustration of an indicia frame 701, moveably held by sliders 730 and moving inside fixed frame 106, in accordance with an embodiment of the present invention. Indicia frame 701 comprises indicia carrier holder 112, bars 710 and 720 which hold and move indicia carrier holder 112, and, in various embodiments including those embodiments described herein, all mechanisms shown or described as being connected to and moving with bars 710 and 720. Indicia frame 701 is analogous to indicia frame 130, described above with reference to FIG. 1A.

A worm-screw bar 702 is driven by servo-motor 700, and the resulting linear motion of part 716 forces pin 718 to move to the left or to the right, depending on the turn of worm-screw bar 702. Part 718 is firmly connected to bar 720 which moves horizontally, but also vertically at the right end in FIG. 5. The vertical movement of bar 720 causes vertical movement of bar 712, which in turn causes vertical movement of the right end of bar 710. Thus the right side of indicia carrier holder 112 is raised or lowered more than the left side, resulting in the turn of indicia carrier holder 112. Indicia carrier holder 112 is attached to bars 720 and 710 which are analogous to bars 302 and 402, as described above in relation to the embodiment shown in FIG. 2. Bar 710 is driven by a drive motor, in some embodiments as in FIG. 4, which is connected to bar 710 by universal joint assembly 612 as shown in FIG. 4. Alternatively other drive mechanisms may be used. At the bottom of FIG. 5, located on base 106, is a spring assembly 780 holding the end of a universal joint. This will be further explained with reference to FIG. 7B below.

Alignment motor 700 in FIG. 5 is fixed in some embodiments, but in some embodiments is detachable, since it is needed only to correct orientation after change of indicia. Alternatively, the alignment is by manual turning of screws or other adjustment knob types.

Figure 6:
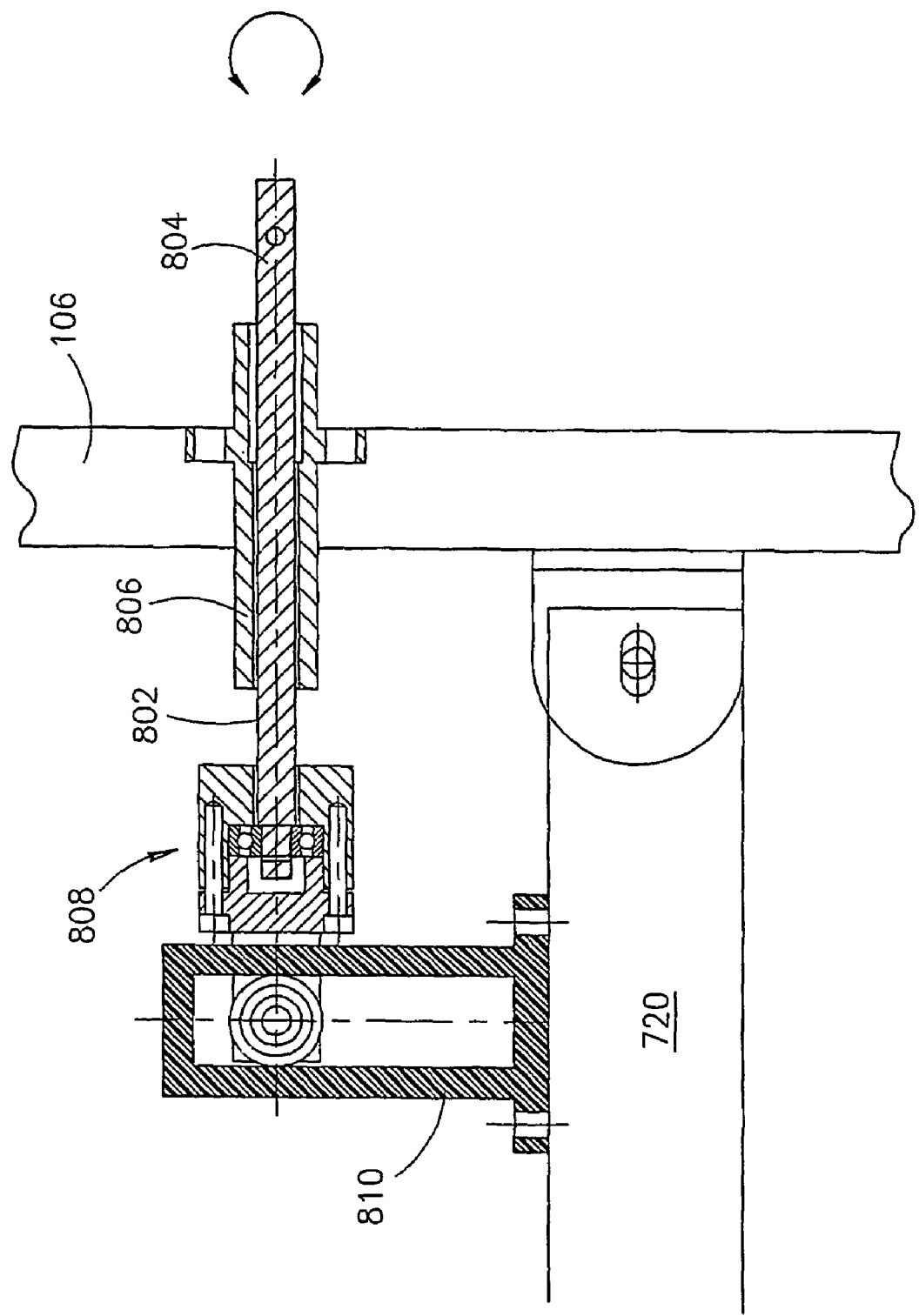
FIG. 6 shows another mechanism using a worm screw assembly for alignment correction, with a detachable motor, in accordance with an embodiment of the invention.

FIG. 6 shows an alternative alignment mechanism to which an external motor may be attached. A worm screw 802 acts similarly to worm screw 702. At the end of worm screw 802 there is a connecting bar 804. Connecting bar 804 passes through a sleeve 806. Sleeve 806 passes through and is fastened firmly to the side of frame 106 of display unit 100. To align the orientation of the indicia carrier a motor (not shown, analogous to motor 700 in FIG. 5) is attached at the end of connecting bar 804. The motor turns connecting bar 804, which, by turning, moves parts 808 and 810, thus moving bar 720 as in the previous embodiment.

Figure 7A:
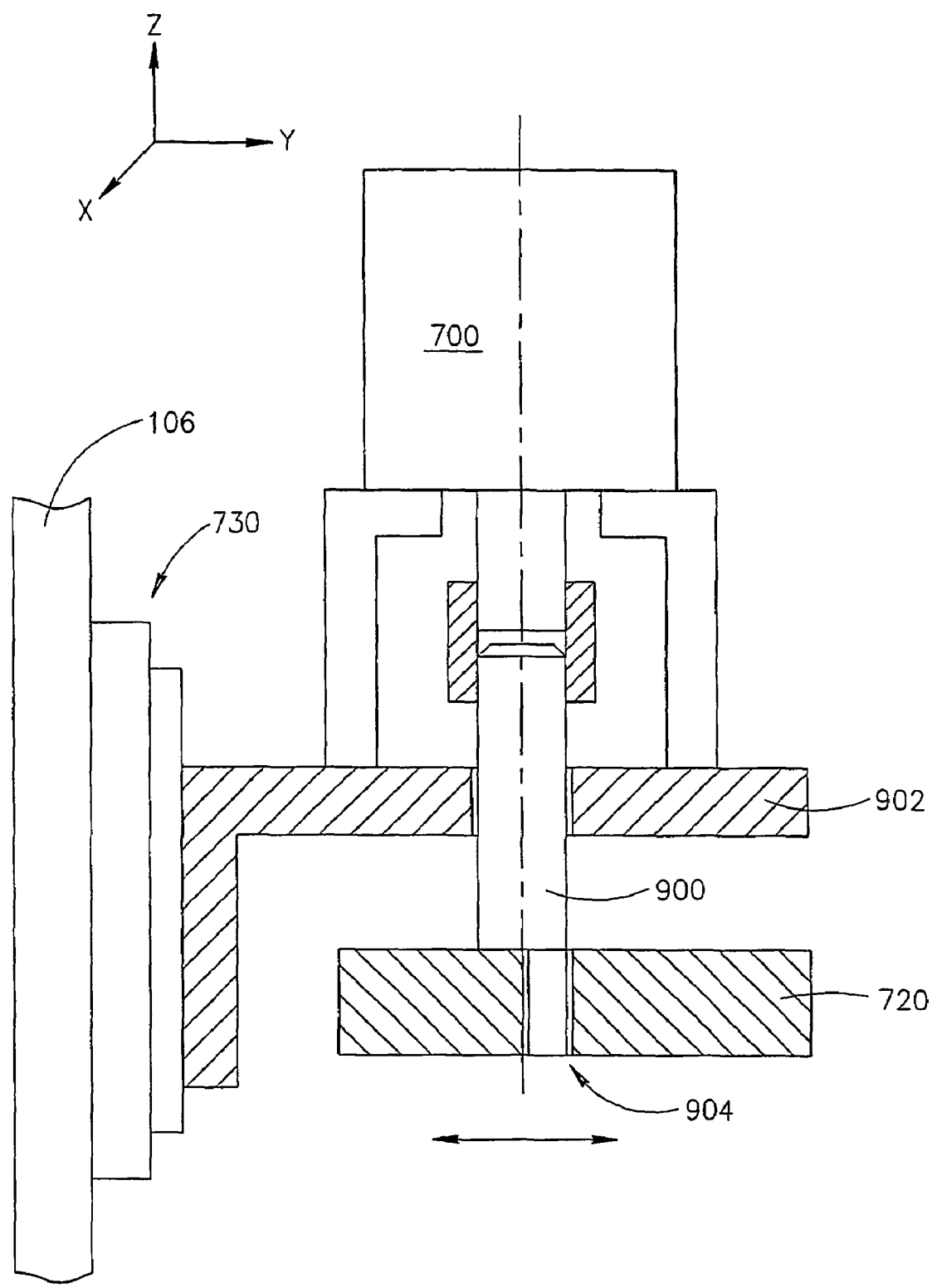
FIG. 7A shows an eccentric bar alignment drive, in accordance with an embodiment of the invention.
Figure 7B:
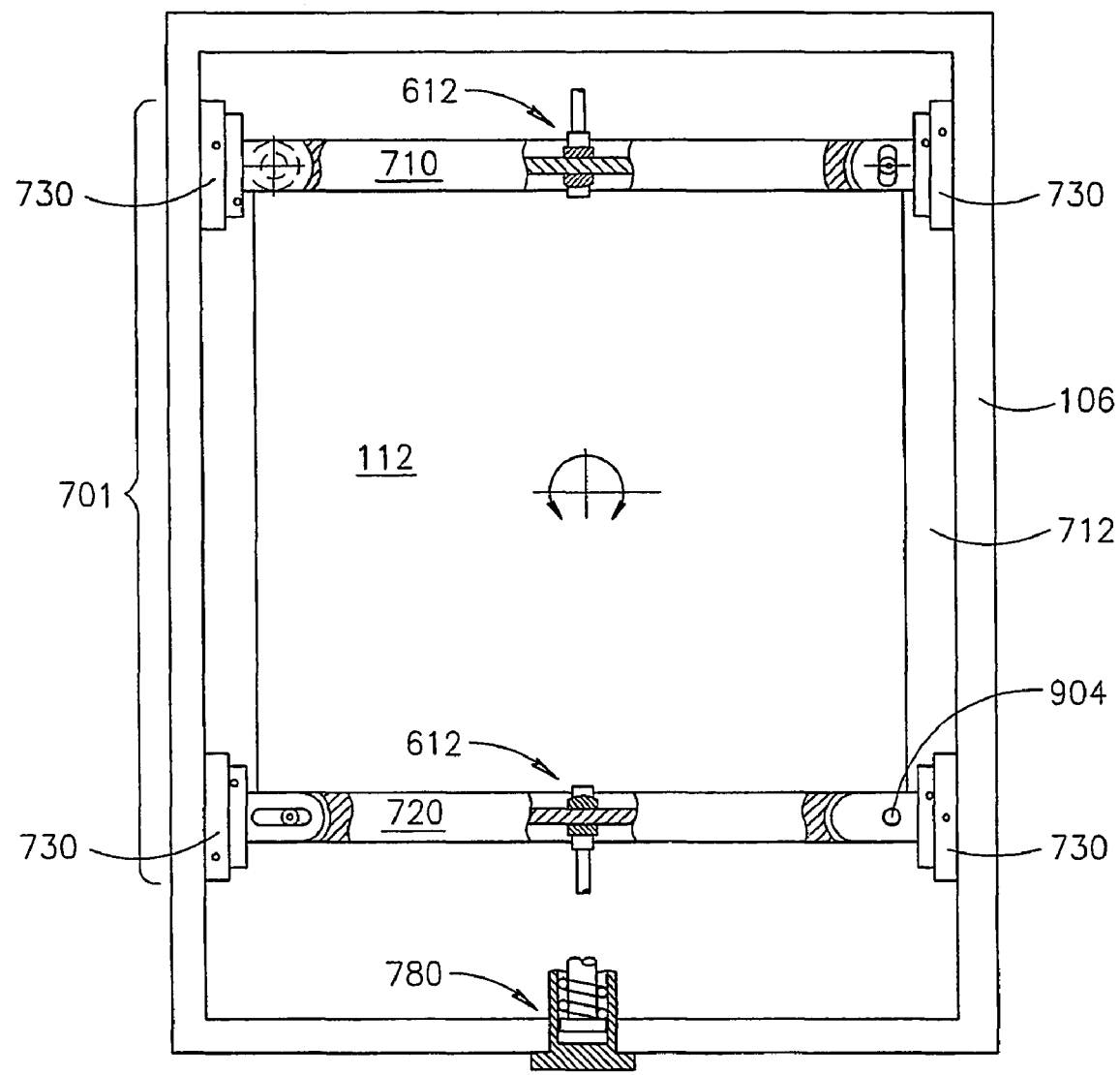
FIG. 7B shows a display device suitable to the eccentric bar alignment drive of FIG. 7A, in accordance with an embodiment of the invention.

FIG. 7A shows an alternative alignment mechanism. Servo-motor 700 is affixed to holding piece 902. Alignment eccentric 900 passes through an opening in holding piece 902. The end of alignment eccentric 900 is movably located in cavity 904 in bar 720. When servo-motor 700 turns, the end of alignment eccentric 900 executes eccentric motion, thus moving bar 720 back and forth. In FIG. 7B holding piece 902 is shown with cavity 904 facing the viewer of FIG. 7B. This mechanism, in which all alignment parts are carried with moving indicia carrier holder 112, enables alignment of indicia carrier 110 while the display device is operating.

FIG. 7B shows bar 710 with universal joint 612, which, as in FIG. 5 connects to a drive mechanism (not shown). In bar 720 there is another, substantially similar, universal joint 612, which connects to spring assembly 780. Spring assembly 780 ensures that indicia carrier holder 112 is under tension, to prevent slippage of indicia carrier 110.

Figure 7C:
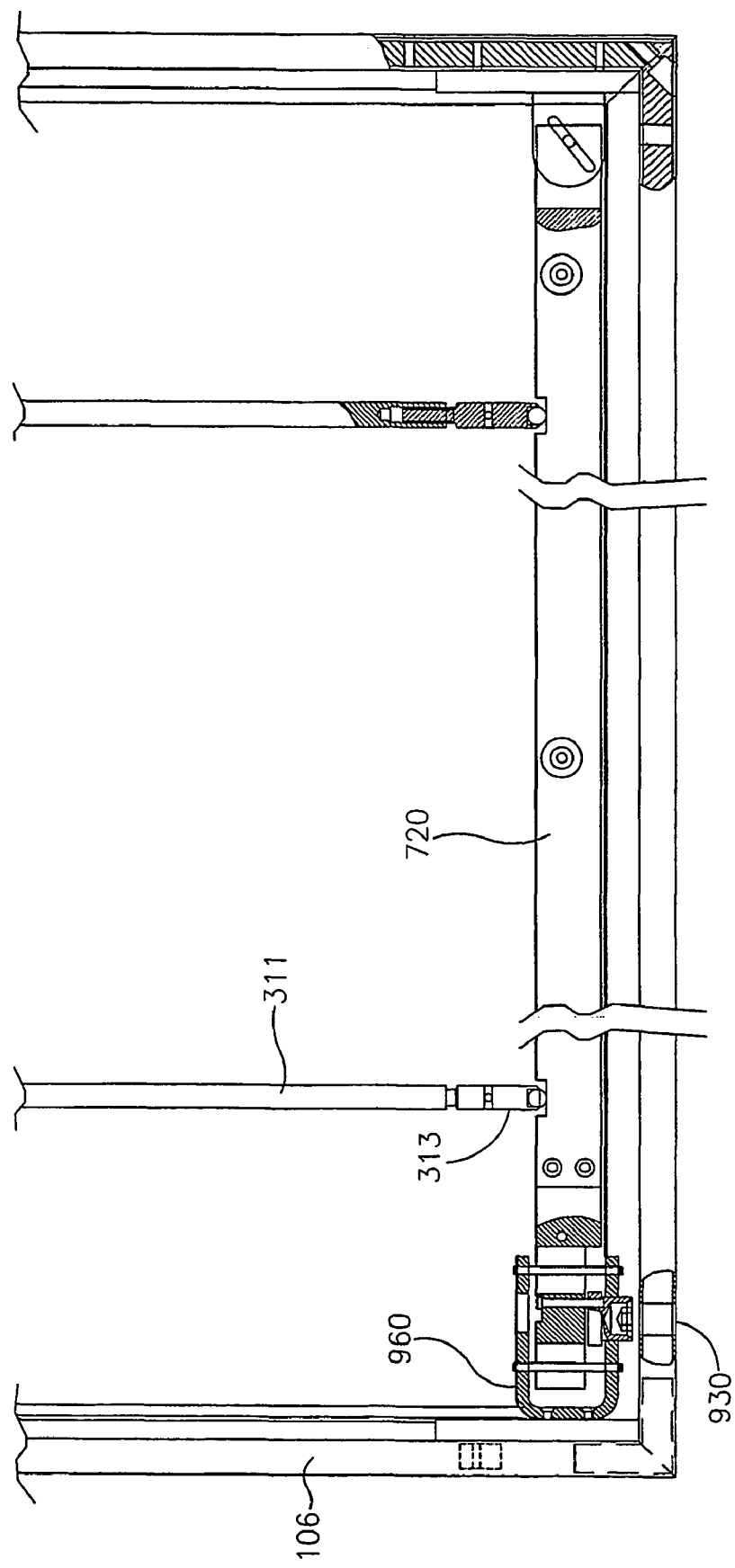
FIG. 7C shows schematically an alternative alignment mechanism, in accordance with an embodiment of the invention.
Figure 7D:
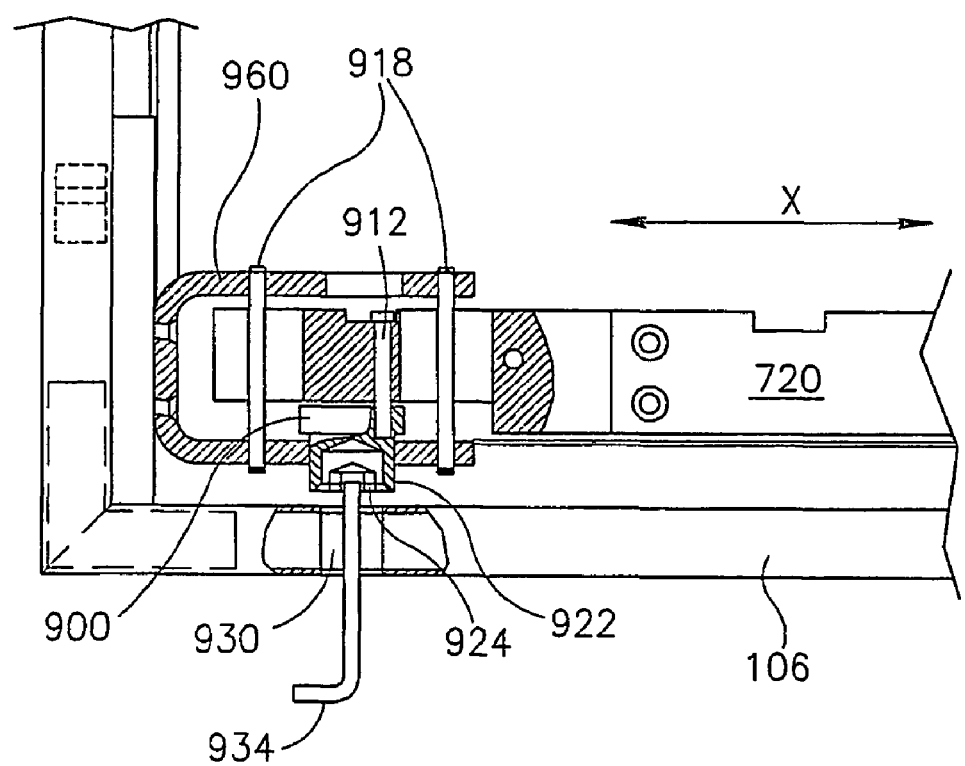
FIG. 7D shows a frontal detail of the alignment mechanism of FIG. 7C, in accordance with an embodiment of the invention.
Figure 7E:
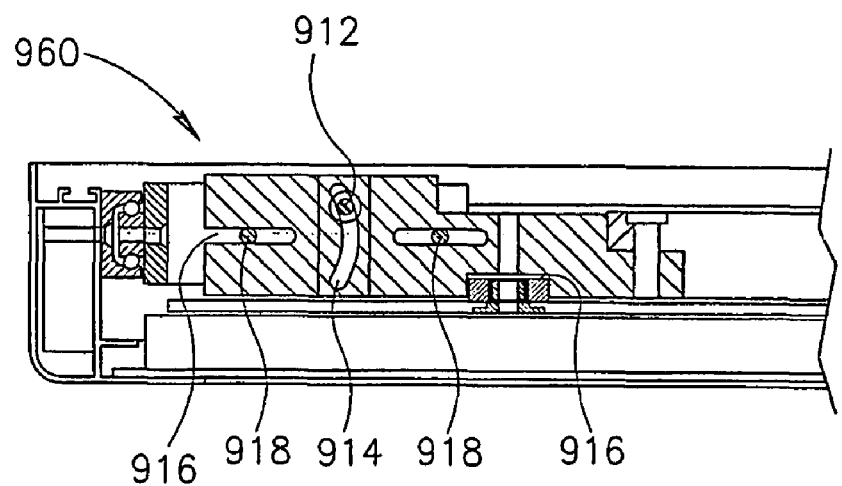
FIG. 7E shows the detail of FIG. 7D from a viewpoint perpendicular to that of FIG. 7D.

FIG. 7C, FIGS. 7D and 7E schematically show an alternative alignment mechanism. This differs functionally from that described in FIG. 7B in that the motion of bar 720 is limited to motion in the X direction. FIG. 7C shows fixed frame 106 as in FIG. 1A, FIG. 2 and FIG. 5, bar 720 as in FIG. 5, and tension rods 311. Here also illustrated are tension rod tightening devices 313, optionally comprising screw mechanisms.

In embodiments utilizing this mechanism, a connecting section 960 connects bar 720 to sliders 730 which connect to and move in frame 106. Connecting section 960 is provided with a curved groove 914 and straight grooves 916.

Pin 912 protrudes from eccentric 900 into curved groove 914, as shown in FIG. 7E. Pin 912 is eccentrically held by eccentric cam 900 in some embodiments, or is eccentrically attached to it in other embodiments, or manufactured with the cam as one complete part in other embodiments.

When eccentric cam 900 turns, pin 912 moves in groove 914, causing horizontal motion of bar 720. Pins 918, moving in constraining grooves 916, constrain the motion to the X direction. The movement of bar 720 in the X direction in embodiments using this apparatus results in the same chain of movements as described in the description of the embodiment shown in FIG. 5 above, thus adjusting the orientation of indicia carrier 110 relative to lens array 102.

In some embodiments, the adjustment of the orientation of the indicia is performed by turning an eccentric cam 900 using the following mechanism: Eccentric cam 900 is attached to a flange having an extension 922 which has an attaching fixture 924, optionally in the form of a depression. Possibly, depression 924 is not round, but shaped, for example in the shape of a hexagon, to enable the insertion of a turning instrument 934, for example an Allen-type key. Extension 922 is situated opposite passageway 930 in fixed frame 106. This construction allows turning instrument 934 to be inserted Through passageway 930 and be attached to attaching fixture 924 without opening the display device.

In some embodiments, turning instrument 934 is operated by hand, in other embodiments by a motor. In some embodiments turning instrument 934 is fixed in place in attaching fixture 924, and in others is detachable. Similarly in some embodiments the motor is substantially permanently fixed to the display device, optionally to frame 106, and in other embodiments the motor is detachable. In some embodiments passageway 930 is protected by a cover.

Figure 9:
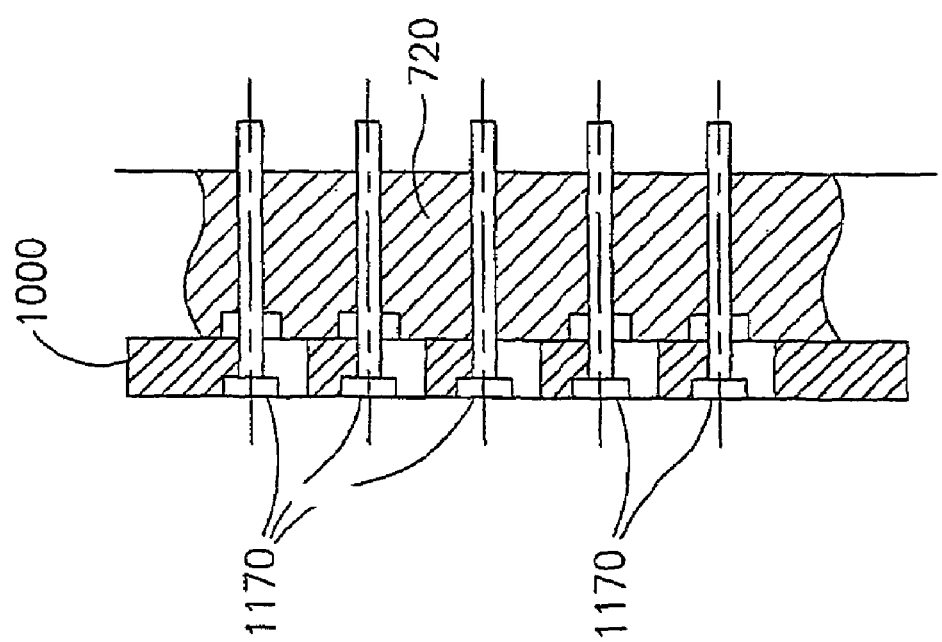
FIG. 9 shows pins upon which the indicia carrier backing of FIG. 8 is fastened.
Figure 8:
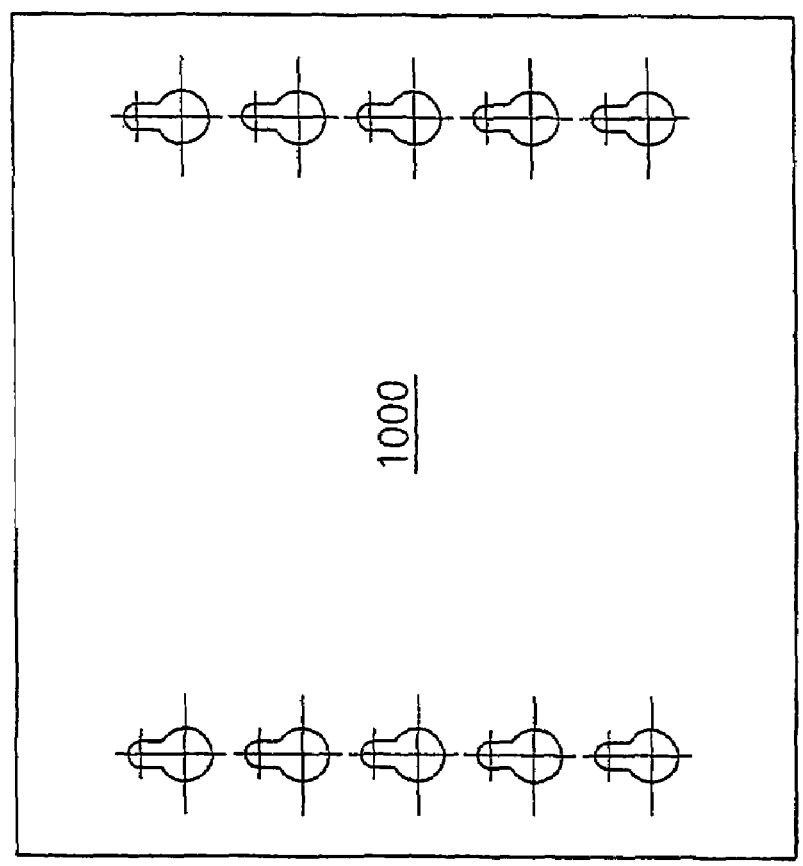
FIG. 8 shows an indicia carrier backing, in accordance with an embodiment of the invention.

FIG. 8 shows an indicia carrier backing 1000. In some embodiments indicia carrier holder 112 is replaced by indicia carrier backing 1000, upon which indicia carrier 110 is pasted. Pins 1170 for holding indicia carrier backing 1000, shown in FIG. 9, are fixed in bars 710 and 720 of FIG. 7B. When inserting indicia carrier backing 1000 on pins 1170, pins 1170 are extended, and indicia carrier backing 1000 is inserted on pins 1170, then pins 1170 are pushed back into place as shown in FIG. 9. With this method indicia carrier backing 1000 can be quickly and easily changed. Alternatively other methods of attaching indicia carrier backing 1000 to either or both of bars 710 and 720 may be employed, for example pasting, clamping or using any appropriate fastening method or combination of methods.

In some embodiments indicia carrier backing 1000 is a solid plate made of a plastic material, upon which the indicia carrier is pasted or otherwise fixed. Indicia carrier 110 may then be made flexible so that it can match expansion caused by temperature fluctuations of the backing. This indicia carrier backing 1000 fits in parallel grooves in bars 710 and 720, and is removable.

In some embodiments of the present invention, motor 424 is controlled by a control device which controls the motion function of indicia frame 701, which, in the present embodiment, comprises bars 710 and 720 and the indicia carrier 110 in holder 112 or held in an alternative fashion.

In some embodiments a control device controls the action of motor 424. For example in some embodiments, control device 550 as shown in FIG. 3 is connected not only to alignment motor 500 shown on FIG. 3, but also to drive motor 424. Thus in some embodiments control device 550 controls the motion of the indicia continuously. In some embodiments control device 550 comprises computing elements, for example one or more processors and/or one or more memory units, to control each phase of the indicia motion cycle independently. Thus it is possible to give different pictures on the display different times of exposure, and/or to vary the order of the display of the different pictures, for example instead of cycling the pictures in the order of (1, 2, 3, 4, 3, 2, 1) the control device may instruct the motor to perform a cycle such as (1, 2, 3, 2, 3, 4, 3, 4, 3, 2, 1. The control device may instruct drive motor 424 to skip certain pictures altogether.

In some embodiments of the invention, control device 550 has a plurality of preprogrammed motion functions. When a new indicia is inserted to indicia frame 701, a matching preprogrammed motion function is selected for displaying the images of the indicia. In some embodiments of the invention, a maintenance person selects the motion function using a human interface of the control mechanism. Alternatively or additionally, the indicia include data and/or programming markings which may be automatically read by an input unit (e.g., a bar code reader) of the control device.

In some embodiments, a control unit such as control unit 570 of FIG. 3 receives the instructions for the action of drive motor 424 from an Input-Output device, which in some embodiments may be a standard keyboard and/or mouse, which connects to control unit 570. Alternatively or additionally the Input-Output device is a hand-held computing device, for example a Palm Pilot type device, which transfers instructions to control unit 570. In some embodiments control unit 570 comprises computing elements, for example one or more processors, memory elements and/or Input-Output elements. The motion cycle is delivered by control unit 570 to control device 550.

In some embodiments of the invention, the motion function controls the distances which indicia frame 710 moves in changing the image displayed by display device 100. These distances are selected responsive to the indicia currently inserted to indicia frame 701. In some embodiments of the invention, the image changing distances are equal for all the images of the indicia. Alternatively, the image changing distance is different for different images. For example, in moving between a first image and a second image, indicia frame 701 moves a first distance while in changing from a second image to a third image indicia frame 701 moves a second distance different from the first distance.

In some embodiments of the invention, the motion function determines the time in which the different images of the indicia are displayed. In some embodiments of the invention, all the images of the indicia are displayed for equal intervals, the length of which intervals is controlled by the control mechanism. For example, indicia which carry picture advertisements without texts have short display periods for the images (in each display round), while indicia with heavy text advertisements have long display periods. Alternatively, different images of the indicia are displayed for different period lengths, for example according to the amount paid for their advertisement.

In some embodiments of the invention, the motion function is set responsive to the image quality of the indicia and/or of lens array 102. For example, low quality images may be displayed for very short periods, preventing viewers from noticing imperfections.

In some embodiments of the invention, the motion function changes responsive to one or more external parameters such as the time of day and/or the date. For example, a first advertisement which is directed to teenagers, receives a larger portion of the display time of a display round during times of the day in which teenagers travel, while advertisements directed to elderly citizens receive larger portions of the display time at times in which elderly citizens travel.

In some embodiments of the invention, the control mechanism comprises one or more sensors (e.g., temperature and/or other weather sensors) and the motion function changes responsive to the indications of the sensors. For example, in cold days longer display periods are given to advertisements for hot drinks while on hot days longer display periods are given to cold drinks. In some embodiments of the invention, the motion function may include not displaying certain images altogether, for example advertisements for cold drinks on cold days. In some embodiments of the invention, indicia are printed with a large number of images and the motion function is used to change the identity of the images being displayed. Thus, the frequency of changing the indicia may be reduced substantially.

In some embodiments of the invention, the control mechanism comprises a communication unit which receives remote instructions. In some embodiments of the invention, an advertisement may be removed or enhanced by sending a remote control instruction to the control mechanism changing the motion function. Alternatively or additionally, when a new indicia is inserted, a maintenance person views the images being displayed. Optionally, if one or more of the images are of low quality the motion function is changed so as not to display the low quality image. In some embodiments of the invention, each image is printed on the indicia twice and the maintenance person selects which of the images should be displayed.

Figure 10:
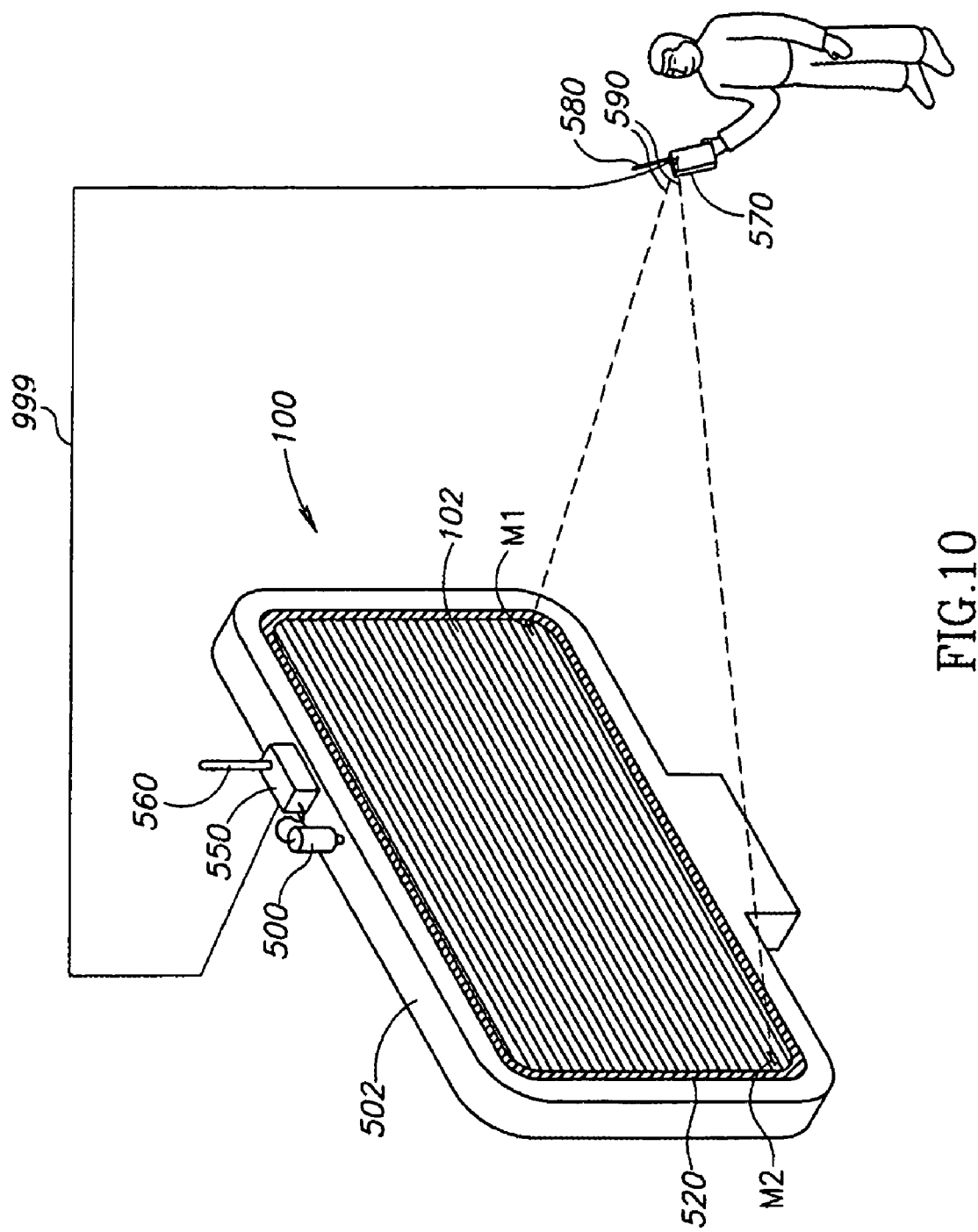
FIG. 10 shows a general schematic view of a street display unit which is connected through wires to a remote control, in accordance with an embodiment of the invention.

FIG. 10 shows schematically the use of a remote control 570 connected through wires 999 to display device 100.

In some embodiments of the invention, lens array 102 comprises relatively large cylindrical lenses, i.e., having a width larger than 11 mm or even 15 mm. The use of such large lenses reduces the printing precision required in printing the indicia inserted to display device 100. It also reduces the sensitivity of the viewed image to small inaccuracies or distortions of the lens array. It is noted that the production of such large lenses is generally considered as requiring a lower precision for a given cost. Therefore, in some embodiments of the invention, lens array 102 is produced in a relatively low precision process. Various methods of compensating for the low precision of the production process are described herein.

In some embodiments of the invention, lens array 102 is manufactured by extrusion or by Computerized Numerical Control. Alternatively, lens array 102 is manufactured using a molding method or roller imprinting.

In an exemplary embodiment of the invention, the display device and the indicia carrier are treated as a complete system with respect to achieving a desired image quality. Thus, the indicia formation process, the alignment and the available device characteristics are considered as variables that can be modified to achieve the desired effect. In one example, strips in the indicia are printed twice, side by side, so that low precision of the lens will still bring a strip from the same image. In another example, the printing on the indicia is matched to known display characteristics. In another example, alignment proceeds only until a required quality is achieved. In another example, certain indicia carriers are used only with higher quality devices (e.g., as determined by testing). In another example, an indicia is formed with distortions that match those of a display device and/or environment. In another example, alignment is used to correct for distortion in a printing process.

In some embodiments of the invention, lens array 102 is produced from a material which has high transparency, and/or achromatism (i.e., having substantially the same index of refraction for all visible light) properties. Alternatively or additionally, the material of lens array 102 has a small heat expansion coefficient and/or color stability (doesn't discolor with time in sunlight). In an exemplary embodiment of the invention, lens array 102 is produced from an acrylic plastic or polypropylene.

In some embodiments of the invention, indicia carrier 110 is produced from a material with a heat expansion coefficient substantially equal to that of the material of lens array 102 (or the same material). Thus, changes in heat, for example due to weather effects, distort indicia carrier 110 and lens array 102 substantially equally, minimizing the introduction of distortions due to temperature changes. One common material for this application is polypropylene. Alternatively or additionally, indicia carrier 110 is pasted on a backing having the desired expansion properties. Alternatively or additionally, the backing and/or the lens (or frames thereof, and/or a volume between them) are heated to distort a desired, compensating, amount.

In some embodiments of the invention, lens assembly 102 is firmly fastened to fixed frame 106 on one or more sides, so as to prevent expansion and contraction of lens array 102 due to temperature changes, on those sides. In some embodiments of the invention, lens array 102 is firmly fastened to fixed frame 106 on the two sides parallel to the direction of the axes of the cylindrical lens array 102. Alternatively, three sides of lens array 102 are fastened to fixed frame 106, allowing expansion of lens array 102 in only one direction.

In some embodiments of the invention, indicia carrier 110 comprises a prepared plastic such as PVC. Alternatively, indicia carrier 110 comprises Panaflex and/or Shimshonite (different weaves of plastic materials) which are relatively strong and stable. Alternatively or additionally, indicia carrier 110 comprises a thick paper or cardboard. Further alternatively, the indicia carrier comprises a photographic print paper, which enables high printing resolution. The indicia carrier may be provided, for example, as a single segment or as multiple segments.

In some embodiments of the invention, the indicia is printed directly on indicia carrier 110. Alternatively, the indicia is printed on a thin substrate such as paper and is then glued or mechanically attached onto indicia carrier 110. In some embodiments of the invention, the indicia is printed by a printer-plotter and/or by screen printing. Alternatively or additionally, the indicia is printed using a lithographic process, offset printing and/or any other printing process.

Some embodiments of the present invention support placing indicia carrier 112 at different distances from lens array 102, for example using preset places or by providing a distance adjustment means, such as a screw or a linear translator. In an exemplary embodiment of the invention, a plurality of perpendicular rods are provided for supporting the indicia carrier or its frame and/or the lens array and/or its frame. These rods are slotted at positions that correspond to the pre-set places. This distance affects the effective magnification of lens 102, which, in turn, dictate the width of strip required (or the effective width utilized). Reducing the width allows placing a greater number of pictures on a single indicia. Thus, a single device can be used to display indicia carriers with different numbers of pictures at different times.

It is noted that non-cylindrical arrays may be used as well. In one embodiment, this is applied by providing that at each different spatial positioning of the lens and the indicia carrier, substantially only portions of a single image are viewed by the lens.

It is noted that the spatial positioning of lens relative to the frame in any of the above embodiments may be one dimensional or two dimensional, for example vertical and/or horizontal motion. The motion between pictures need not be in a straight line or be the same for different picture transitions. In addition, some embodiments of the invention may utilize other types of selective viewing mechanisms, even ones that do not use lens, for example, a perforated surface that presents the image that corresponds to the parts visible through the perforations.

In some embodiments of the invention embodiments, the plane in which the indicia carrier moves is not in the focal plane of the lens array, thus preventing the scorching of the indicia by incident sunlight.

It will be appreciated that the above described methods may be varied in many ways, including, changing the order of steps, and the exact implementation used, for example, any combination of one or more of the lens, indicia holder and indicia carrier may be moved to achieve the desired relative motion. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A display device for displaying a plurality of changing images, comprising:
   a multi-image indicia carrier having a plurality of images formed thereon, each of said images being formed as a plurality of sections;
   an image selector adjacent said carrier that selectively presents the sections relating to at least one image, thereby displaying said at least one image;
   a motion train that effects said selection by providing relative motion between said indicia carrier and said image selector;
   at least one alignment element that adjusts at least one of said motion train and a relative arrangement of said indicia carrier and said image selector; and
   a signal receptor adapted to receive control signals, from a remote control,
   wherein said at least one alignment element is responsive to said control signals to align said indica carrier and said image selector.

2. A display according to claim 1, wherein said image selector comprises an array of lenses, each of said lenses selectively presenting at least one of said sections.

3. A display according to claim 2, wherein said array comprises a one-dimensional array of cylindrical lenses.

4. A display according to claim 1, comprising an indicia frame to which said indicia carrier is attached.

5. A display according to claim 4, wherein said indicia is inserted into said frame.

6. A display according to claim 4, wherein said indicia is pasted onto said frame.

7. A display according to claim 4, wherein said indicia is mechanically attached to said frame.

8. A display according to claim 4, wherein said motion train mechanically couples said frame to said image selector and provides relative motion therebetween.

9. A display according to claim 4, wherein said motion train mechanically couples said indicia carrier to said image selector and provides relative motion therebetween.

10. A display according to claim 4, wherein said alignment element aligns said frame relative to said image selector.

11. A display according to claim 4, wherein said frame is moved from a position adjacent said image selector for loading of a carrier into said frame.

12. A display according to claim 1, wherein said motion train moves said image selector.

13. A display according to claim 1, wherein said indicia carrier is substantially rigid.

14. A display according to claim 1, wherein said indicia carrier is flexible.

15. A display according to claim 1, wherein said indicia carrier comprises a plurality of parts.

16. A display according to claim 1, wherein said indicia carrier is provided as a single part.

17. A display according to claim 1, wherein said alignment element adjusts an orientation angle between said indicia carrier and said image selector.

18. A display according to claim 1, wherein said alignment element adjusts an in-plane offset between said indicia carrier and said image selector.

19. A display according to claim 1, wherein said alignment element adjusts a rate of motion of said motion train.

20. A display according to claim 1, wherein said at least one alignment element adjusts an amount of motion of said motion train.

21. A display according to claim 1, wherein said alignment is uniform for all of said display.

22. A display according to claim 1, wherein said alignment is different for different parts of said display.

23. A display according to claim 1, wherein said alignment is limited to adjusting in one linear degree of freedom of said display.

24. A display according to claim 1, wherein said at least one alignment element aligns in at least two degrees of freedom of said display.

25. A display according to claim 1, wherein said at least one alignment element comprises at least one spacer screw.

26. A display according to claim 25, comprising at least one motor to turn said spacer screw, to effect alignment of the display.

27. A display according to claim 1, wherein said at least one alignment element comprises a driving element constrained to move in one dimension.

28. A display according to claim 1, wherein said at least one alignment element is adapted to correct for temperature-caused distortions.

29. A display according to claim 1, wherein said at least one alignment element is adapted to correct for distortions caused by indicia creation.

30. A display according to claim 1, wherein said at least one alignment element is adapted to correct for distortions caused by image-selector manufacture.

31. A display according to claim 1, comprising at least one tensioning element for maintaining a tension in said indicia carrier.

32. A display according to claim 31, wherein said at least one tensioning element comprises at least one of a rod and a spring.

33. A display according to claim 1, comprising a manual remote control for effecting alignment of said display device.

34. A display according to claim 33, wherein said remote control is adapted to be used within a viewing distance of said display.

35. A display according to claim 33, wherein said remote control is adapted to be used outside of a viewing distance of said display.

36. A display according to claim 1, wherein said alignment element is used to select at least one image not to display.

37. A display according to claim 1, wherein said alignment element is used to select at least one motion profile to match a time or a date.

38. A display according to claim 1, wherein said image selector presents said image as a presentation having a surface of at least 0.5 square meters.

39. A display according to claim 1, wherein said image selector presents said image as a presentation having a surface of at least 1 square meters.

40. A display according to claim 1, wherein said image selector presents said image as a presentation having a surface of at least 2 square meters.

41. A display according to claim 1, wherein said image selector presents said image as a presentation having a surface of at least 4 square meters.

42. A display according to claim 1, wherein said image selector presents said image as a presentation having a surface of at least 9 square meters.

43. A display according to claim 1, wherein said display is adapted to fit onto a static display device.

44. A display according to claim 1, wherein said display is adapted to withstand an outdoor environment.

45. A display according to claim 44, wherein said display is adapted to operate over a range of outdoor temperatures.

46. A display according to claim 44, wherein said display includes vents for excess humidity.

47. A display according to claim 44, wherein said display includes a heater.

48. A display according to claim 44, wherein said display includes protection of said indicia carrier from direct sun.

49. A display according to claim 44, wherein a temperature-related distortion of said indicia matches a temperature-related distortion of said image selector.

50. A display according to claim 44, wherein a temperature-related distortion of said display device is directed by a structure of said display to be expressed in a manner that reduces presentation distortion.

51. A display according to claim 1, wherein said image selector comprises a plurality of parts.

52. A display according to claim 51, wherein said alignment element provides relative alignment between said plurality of image selector parts.

53. A display according to claim 1, wherein said image selector comprises a panel defining a plurality of holes.

54. A display according to claim 1, wherein the at least one alignment element comprises a motor.

55. A display according to claim 54, wherein the motion train includes a motor that provides the relative movement, separate from the motor of the at least one alignment element.

56. A display according to claim 1, comprising a control device adapted to control a motion function of the motion train.

57. A display according to claim 56, wherein the motion function may be controlled to give different ones of the plurality of images different times of exposure in a motion cycle of the display.

58. A display according to claim 1, comprising at least one sensor and wherein a motion function of the motion train changes responsive to readings of the sensor.

59. A display according to claim 1, wherein the signal receptor is adapted to receive control signals from the remote control, wirelessly.

60. A display according to claim 1, wherein the signal receptor is adapted to receive control signals from the remote control, through wires.

61. A display device for displaying a plurality of changing images, comprising:
- a multi-image indicia carrier having a plurality of images formed thereon, each of said images being formed as a plurality of sections;
- an image selector adjacent said carrier that selectively presents the sections relating to at least one image, thereby displaying said at least one image;
- a motion train that effects said selection by providing relative motion between said indicia carrier and said image selector;
- at least one alignment element that adjusts at least one of said motion train and a relative arrangement of said indicia carrier and said image selector, to provide a corrected display of said image, within said selection; and
- circuitry adapted to effect automatic alignment of said display device, responsive to a signal from a remote control device.

62. A display according to claim 61, and comprising circuitry including a camera for imaging at least one of said images and providing an indication of misalignment to said control circuitry.

63. A display according to claim 61, and comprising circuitry including a sensor for detecting at least one marking on said indicia carrier and providing an indication of misalignment to said control circuitry.

64. A display according to claim 61, wherein said controller is continuously active to effect said alignment.

65. A display device for displaying a plurality of changing images, comprising:
- a multi-image indicia carrier having a plurality of images formed thereon, each of said images being formed as a plurality of sections;
- an image selector adjacent said carrier that selectively presents the sections relating to at least one image, thereby displaying said at least one image;
- a motion train that effects said selection by providing relative motion between said indicia carrier and said image selector; and
- at least one alignment element that adjusts at least one of said motion train and a relative arrangement of said indicia carrier and said image selector, to provide a corrected display of said image, within said selection,
- wherein at least a part of said at least one alignment element is adapted for removal after alignment.

66. A display device for displaying a plurality of changing images, comprising:
- a multi-image indicia carrier having a plurality of images formed thereon, each of said images being formed as a plurality of sections;
- an image selector adjacent said carrier that selectively presents the sections relating to at least one image, thereby displaying said at least one image;
- a motion train that effects said selection by providing relative motion between said indicia carrier and said image selector;
- at least one alignment element, including a motor, that adjusts at least one of said motion train and a relative arrangement of said indicia carrier and said image selector, to provide a corrected display of said image, within said selection.

67. A display according to claim 66, wherein the motion train is controllable to display different images for different times.

68. A display according to claim 66, wherein the motion train includes a motor that provides the relative movement, separate from the motor of the at least one alignment element.

69. A display according to claim 66, wherein said alignment element adjusts at least one of a distance between said indicia carrier and said image selector, an orientation angle between said indicia carrier and said image selector, an in-plane offset between said indicia carrier and said image selector, a magnification of said image selector, a rate of motion of said motion train and an amount of motion of said motion train.

* * * * *